United States Patent

Gummel

[15] 3,683,417

[45] Aug. 8, 1972

[54] APPARATUS AND MACHINE-IMPLEMENTED PROCESS FOR DETERMINING THE TERMINAL CHARACTERISTICS OF A BIPOLAR TRANSISTOR

[72] Inventor: Hermann Karl Gummel, North Plainfield, N.J.

[73] Assignee: Bell Telephone Laboratories, Incorporated, Berkeley Heights, N.J.

[22] Filed: Jan. 23, 1970

[21] Appl. No.: 5,171

[52] U.S. Cl. ......................................................444/1
[51] Int. Cl...........................G06f 15/04, G06f 15/32
[58] Field of Search ...................235/150, 152; 444/1

[56] References Cited

OTHER PUBLICATIONS

R. K. Richards, Arithmetic Operations in Digital Computers 1955 pp. 354– 358

R. Beaufoy, The Junction Transistor as a Charge–Controlled Device A. T. E. Journal Vol. 13, No. 4 Oct. 1957 pp. 310– 327

D. Koehler, The Charge–Control Concept in the Form of Equivalent Circuits, Representing a Link Between the Classic Large Signal Diode & Transistor H. Gummel, A Charge–Control Transistor Model For Network Analysis Programs " Proceeding Letters" April 1968 p. 751

F. Lindholm, Integrated–Circuit Transistor & Diode Models For Network–Analysis Programs " IEEE Trans on Circuit Theory" January 1971 pp. 122– 128

*Primary Examiner*—Eugene G. Botz
*Assistant Examiner*—David H. Malzahn
*Attorney*—R. J. Guenther and William L. Keefauver

[57] ABSTRACT

Apparatus incorporating a machine-implemented process of analyzing bipolar transistors which is suitable for use in network analysis and design computer programs and which is particularly applicable to the analysis of integrated circuit transistors. The process uses a novel charge control relation linking junction voltages, collector current and base charge in which the base charge is expressed as a function of the bias, resulting in improved accuracy in comparison with the conventional Ebers-Moll formulation.

13 Claims, 12 Drawing Figures

INVENTOR
H. K. GUMMEL
BY R. O. Nimtz
ATTORNEY

APPARATUS AND MACHINE-IMPLEMENTED PROCESS FOR DETERMINING THE TERMINAL CHARACTERISTICS OF A BIPOLAR TRANSISTOR

BACKGROUND OF THE INVENTION

1. Field of the Invention

This invention relates to apparatus and machine-implemented processes for analyzing electrical networks and specifically to an apparatus and a method of analyzing bipolar transistors.

2. Description of the Prior Art

The advent of integrated circuit technology has signaled the end of the usefulness of breadboarding in circuit design. The cost and length of time required to produce an integrated circuit prohibits cut-and-try methods of varying component values and testing the resulting circuit until the desired performance is achieved. Parallel developments in digital computer technology have served to bridge this gap by providing an automatic means of circuit design which uses mathematical models of circuit components to allow the evaluation of proposed circuit designs without actually constructing the circuits. The increased use of such simulative techniques has stimulated the demand for better mathematical models of circuit components. There are adequate models for both linear and nonlinear passive components. However, present methods of integrated circuit fabrication emphasize the replacement of passive elements with active elements whenever possible as being economically attractive. This increases the need for the development of good models of active devices and, in particular, the need for a good bipolar transistor model.

The major prior art network analysis programs simulate bipolar transistors by using the Ebers-Moll model, described in "Large-Signal Behavior of Junction Transistors" by J. J. Ebers and J. L. Moll, Proceedings of the IRE, Vol. 42, December 1954, pages 1761 and 1762, in charge control form, that is, with frequency dependent control generators replaced by time dependent stored charges. This model has proved very successful in the analysis of noncritical circuits, those in which the performance is dominated by passive feedback. The basic Ebers-Moll model does, however, present the following difficulties: high-injection effects are not included; it gives constant current gain independent of the collector current; it does not render the high-current fall-off of $f_T$; the Early effect, a low-frequency output conductance approximately proportional to the collector current, is difficult to simulate; and, the usual analytic approximations for the junction capacitances become singular when the junction voltage equals the quantity commonly known as the "built-in voltage."

Some of these effects have been included in the Ebers-Moll model by particular prior art network analysis programs. The common approach has been to specify some parameters of the model as functions of bias and to describe this bias dependence in tabular form or through parametric equations. Two examples of the approach are the NET-1 and CIRCUS programs which, along with several others, are briefly mentioned in Chapters 1, 4, and 6 of the test *Computer-Aided Integrated Circuit Design*, edited by Gerald J. Herskowitz, McGraw-Hill, Inc., 1968. In the NET-1 program, the common-emitter current gain is given by a series expansion in the emitter-base voltage. In the CIRCUS program, forward and reverse current gains and forward and reverse transit times are specified as functions of collector current in tabular form. Such "curve-fitting" modeling tends to require large numbers of parameters or table entries for an accurate description. Also, frequently the parameters are not easily interpretable in terms of the device structure and thus can be obtained only a posterori, from detailed measurements, and cannot be conveniently predicted.

Accordingly, it is an object of this invention to provide an accurate apparatus and method for analyzing bipolar transistors which can be used in conjunction with parameters derived from actual measurements or the structural characteristics of these transistors to provide an aid to their design.

It is a specific object of this invention to provide an apparatus that incorporates a method of simulating bipolar transistors which includes high injection effects, allows variable current gain, renders the high-current fall-off of $f_T$, exhibits the Early effect, and allows the junction voltage to equal or exceed the built-in voltage.

SUMMARY OF THE INVENTION

In accordance with the invention these objects are achieved by means of apparatus incorporating a machine-implemented process that computes the terminal characteristics of a bipolar transistor from a set of parameters that may be obtained from either direct measurements upon the transistor itself or from a specification of the transistor's physical structure. The process performs this computation by using a novel charge-control relation, derived from basic physical considerations, which includes a bias-dependent base charge term. This relation may be expressed as $$I_{cc} = -I_s Q_{bo} \frac{\exp(qV_{eb}/kT) - \exp(qV_{cb}/kT)}{Q_b} \quad (1)$$

where $I_{cc}$ is the dominant component of collector current, $V_{eb}$ is the emitter to base voltage, $V_{cb}$ is the collector to base voltage, $k$ is Boltzmann's constant, $T$ is the absolute temperature, $q$ is the magnitude of the electronic charge, $I_s$ intercept or saturation current, $O_{bo}$ is the zero bias base charge,--; and $Q_b$ is an explicit function of the externally applied bias. This dependence of $I_{cc}$ upon the bias-dependent base charge serves to automatically incorporate high-level injection and the Early effect into the machine process.

DETAILED DESCRIPTION

Figure 1:
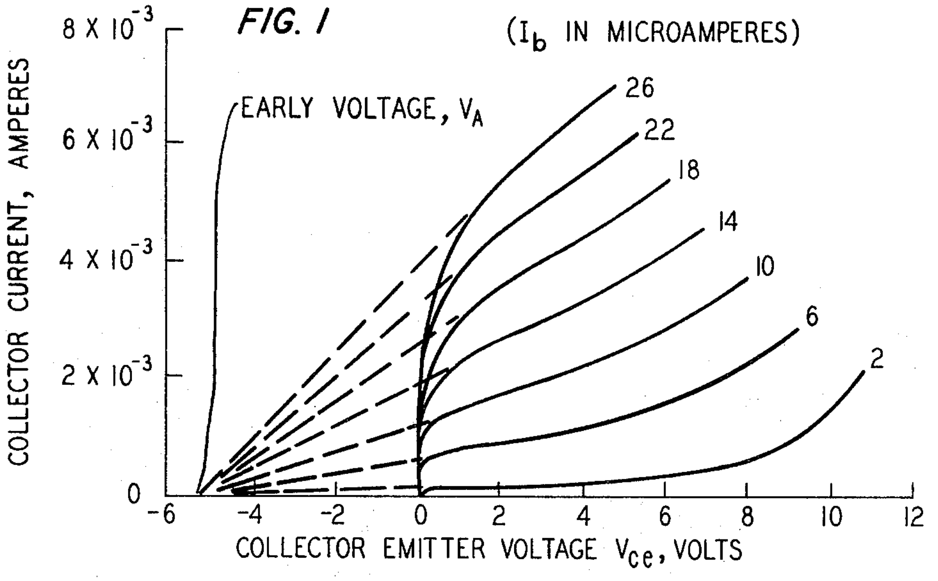
FIG. 1 is a graphical definition of the meaning of the term "Early voltage;"

The detailed process of this invention uses a set of equations embodying 21 parameters that are based upon the novel charge control relationship of Equation (1). The process is adapted to fit into a general circuit analysis program in which the dynamic operation of a circuit is found by computing the state of the circuit at successive instances of time. In accordance with the requirements of such general programs, the process uses as inputs the values of $V_{eb}$, $V_{cb}$, $I_c$, and $Q_b$. If at any time the values of these quantities are either known or given, all other quantities inherent in the process can be computed explicitly and directly. Any two of these quantities can be chosen arbitrarily; the remaining two are then determined implicitly by the process. Thus the process provides two constraints and the circuit surrounding the transistor being analyzed provides two additional constraints.

In practical operation, trial values for the four inputs are obtained by time evolution from both the state of the transistor being analyzed and the surrounding circuit at a prior time. The process returns the values of $I_c$, $Q_b$, and $I_b$ that result from substituting the four input values into the equations that describe the process. The process also returns the values of the partial derivative of each of these quantities with respect to $V_e$, $V_c$, $I_c$, and $Q_b$. The general circuit analysis program uses these output values and their partial derivatives to iteratively adjust the four input values in a manner well known to those skilled in the art of programmed circuit analysis until discrepancies between the input and output values of $I_c$ and $Q_b$ are negligible or are acceptably small. At this point the current state of the entire circuit being analyzed has been determined to the required degree of precision and the general circuit analysis program can proceed with its next step. The time derivative of the base charge may be handled as in conventional charge control theory, i.e., the time derivative of the base charge equals the difference of the sum of instantaneous terminal currents and the sum of direct current terminal currents that correspond to the instantaneous value of the base charge. All time derivatives can thus be computed and the general program can carry the analysis to the next step in time.

The invention may be most clearly understood by considering, in turn, the theoretical basis of the charge-control relation of Equation (1); the mathematical description of the manner in which the process uses the charge-control relation; a summary of the parameters and equations of the process; an illustrative example of a typical use of the process; and the machine implementation of the process.

THEORETICAL BASIS OF THE CHARGE-CONTROL RELATION OF EQUATION 1

The Ebers-Moll equations may be written in the form:

$$\begin{pmatrix} I_e \\ I_c \end{pmatrix} = [T] \begin{pmatrix} \exp(qV_{eb}/kT) - 1 \\ \exp(qV_{cb}/kT) - 1 \end{pmatrix} \quad (2)$$

where T is a symmetric matrix of coefficients that are constant, i.e., bias independent. At the time when the Ebers-Moll model was developed, attainable base widths were large by today's standards, and in order that useful current gains could be obtained, lifetime in the device had to be long. Reverse saturation currents were used as indicators of lifetime. These circumstances are reflected in the notation that was used for the elements of $T$:

$$T = \begin{pmatrix} \frac{I_{eo}}{1-\alpha_n\alpha_i} & -\frac{\alpha_i I_{co}}{1-\alpha_n\alpha_i} \\ -\frac{\alpha_n I_{eo}}{1-\alpha_n\alpha_i} & \frac{I_{co}}{1-\alpha_n\alpha_i} \end{pmatrix} \quad (3)$$

where $I_{eo}$ and $I_{co}$ are emitter and collector reverse saturation currents and $\alpha_n$ and $\alpha_i$ are forward and reverse common base current gains. A simpler and more appropriate but fully equivalent notation is $$T = \begin{pmatrix} (1+1/\beta_f)I_s & -I_s \\ -I_s & (1+1/\beta_r)I_s \end{pmatrix} \quad (4)$$

Here $\beta_f$ and $\beta_r$ are forward and reverse common emitter current gain and $I_s$ is the "intercept" current, i.e., the current obtained when on a semilog plot of $I_c$ vs. $V_{eb}$ the collector current is extrapolated to $V_{eb} = 0$. The notation of Equation (4) is considered more appropriate since the intercept current $I_s$ is nearly independent of current gains. The matrix elements $T_{12}$ and $T_{21}$ in Equation (3) show an apparent dependence on lifetime through the forward and reverse current gains. Actually, this dependence is nearly cancelled by that of $I_{eo}$ and $I_{co}$. To a very good approximation the intercept current $I_s$ depends only on the total number of impurities in the base.

Equation (2) with the matrix $T$ given by Equation (4) suggests the following interpretation: The emitter and collector current have a common, dominant component $$I_{cc} = -I_s[\exp(qV_{eb}/kT) - \exp(qV_{cb}/kT)]. \quad (5)$$

In addition, the emitter and collector currents have each a separate component $I_{be}$ and $I_{bc}$, which is proportional to the reciprocal forward and reverse common emitter current gain:

$$I_{be}=(I_s/\beta_f)\,[\exp(qV_{eb}/kT)-1] \quad (6)$$

$$I_{bc}=(I_s/\beta_r)\,[\exp(qV_{cb}/kT)-1] \quad (7)$$

The terminal currents are then given by $$I_e=-I_{cc}+I_{be} \quad (8)$$

$$I_c=I_{cc}+I_{bc} \quad (9)$$

$$I_b=-I_{be}-I_{bc} \quad (10)$$

So far, no changes have been made in the content of the Ebers-Moll equations; they have only been brought into a form that will facilitate the development of the new model. In the generation of the new model, Equations (8) – (10) will be maintained and Equations (5) – (7) will be replaced by relations giving an improved representation of the physical processes in the transistor.

The separation of emitter and collector currents into the dominant $I_{cc}$ component and the base current components in Equations (8) and (9) allows the giving of different voltage dependence to the individual components. For example, at low injection levels collector current and emitter-base voltage are related through the "ideal" diode law; i.e., the collector current is proportional to $\exp(qV_{eb}/nkT)$ where the "emission coefficient" $n$ is very close to unity. The base current at low forward bias, on the other hand, is typically a "nonideal" current, i.e., it has an emission coefficient $n$ with values typically between 1.5 and 2. This nonideal current results from space charge recombination or surface recombination, or the presence of both effects. At higher forward emitter-base voltages the base current is dominated by an ideal component.

In principle it is possible to compute the base current as a function of $V_{eb}$ (for given $V_{cb}$) for one-dimensional structures, provided that the doping profile and the recombination parameters, e.g., the concentration as a function of distance of the important species of recombination centers, as well as their energy levels and capture cross sections, are known. However, in practice, the recombination properties are not known to the detail required for such calculations. Even the assumption of a constant concentration of one species of recombination centers is a gross oversimplification. In real transistors the lack of lattice perfection in heavily doped regions causes enhanced recombination, and interfaces between substrates and epitaxial layers provide local regions of high recombination.

Nevertheless, detailed studies have confirmed that the base current can be described by a sum of terms exponential in voltage with emission coefficients of the magnitude indicated above. Equations (6) and (7) may thus be replaced by more general functions of $V_{eb}$ and $V_{cb}$ that are characterized by pre-exponential coefficients and emission coefficients which become model parameters and which represent the overall recombination properties and influence the dependence of forward and reverse current gain on bias.

The next step is to replace the expression for $I_{cc}$ that is shown in Equation (5) with an expression that does not involve low-injection approximations. In order to do this, a return to basic physical considerations must be made.

Consider a one-dimensional transistor of p-n-p polarity. The hole-current density is given by $$j_p=q\mu Ep-qDp' \quad (11)$$

where standard notation is used. The first term on the right is drift current; the second, diffusion current. The approximation is made that the Einstein relation between mobility and diffusivity holds:

$$D=kT/q\,\mu.$$

Approximation (a)

It is assumed that:

Electric fields are low enough for avalanche multiplication of carriers to be negligible.

Approximation ($b_1$)

The velocity-field relation is idealized by the field dependent mobility expression:

$$\mu=\frac{\mu_o}{1+\dfrac{\mu_o|E|}{v_s}} \quad \text{Approximation } (b_2)$$

where $\mu_0$ $qD_0/kT$ is the low-field mobility, considered for convenience independent of doping, and where $v_s$ is the scattering limited velocity. Approximation ($b_1$) places an upper limit on allowable bias. It is known that $D$ is underestimated at high fields by (a) and ($b_2$) and that ($b_2$) yields too gradual a transition from low field velocities to the high field saturated velocity. Nevertheless, Approximations (a) and (b) afford significant simplifications in the treatment to follow and are retained for that reason. To the extent that the final result, Equation (25) is affected by them, it must be considered approximate. The errors depend on bias and doping profile; they are not expected to exceed a few percent for typical situations. The error due to Approximation ($b_2$) overemphasizes velocity saturation effects and may be alleviated by choice of values of $v_s$ larger than the final saturation value in high-field regions. In high-field regions the current is carried predominately as drift current, with a carrier concentration that is nearly constant in such regions, so that errors in D are of minor consequence.

Next, a quantity $a(x)$, which is the ratio of the hole current density at position $x$ to the current density $j_c$ leaving the collector terminal, is defined.

$$a(x)=j_p(x)/j_c \quad (12)$$

For dc conditions, considered here, $a$ approaches unity at the collector and is $1/\alpha=(1+\beta)/\beta$ at the emitter. For large common emitter current gain $\beta$, $a$ differs negligibly from unity. Using $$E=-\frac{kT}{q}\psi' \quad (13)$$

where $\psi'$ is the electrostatic potential in units of the Boltzmann voltage $kT/q$, and considering Equation (11) as a differential equation for $p(x)$, its solution, when $p$ is specified at a point $x_1$, is $$p(x)=p(x_1)e^{\psi(x_1)-\psi(x)}-\frac{j_c}{qD_o}\int_{x_1}^{x}a(t)e^{\psi(t)-\psi(x)}dt$$

$$-\frac{j_c}{qv_s}\int_{x_1}^{x}a(t)|\psi(t)'|e^{\psi(t)-\psi(x)}dt. \quad (14)$$

Equation (14) is valid for any pair of points $x_1$ and $x$. Next, the outside edges of emitter and collector transition regions are denoted by $x_E$ and $X_C$, and Equation (14) is used with $x_1 = X_E$ and $x = x_C$. Multiplication of Equation (14) by e $^{(x)}$) and use of $$p(x) = n_i e^{\varphi_p(x)-\psi(x)} \quad (15)$$

$$n(x) = n_i e^{\psi(x)-\varphi_n(x)} \quad (16)$$

where $\phi_p$ and $\phi_n$ are hole and electron quasi-fermi levels in units of the Boltzmann voltage, yields $$j_c = \frac{qD_o n_i^2 (e^{\varphi_p(x_E)} - e^{\varphi_p(x_C)})}{\int_{x_E}^{x_C} a(t) n_i e^{\psi(t)} dt + \frac{n_i D_o}{v_s} \int_{x_E}^{x_C} a(t)|\psi'(t)| e^{\psi(t)} dt} \quad (17)$$

The second term in the denominator is negligible. The integrals in the denominator obtain the largest contribution from the region near $x_m$ where $\psi(x)$ attains its maximum value $\psi_m$. If in the second integral $a(t)$ is replaced by its value $a_m$ at $x_m$, and if $e^{\psi(x_E)}$ and $e^{\psi(x_C)}$ are neglected in comparison with $$e^{\psi_m}$$

— all very reasonable assumptions — the second integral in the denominator becomes $$\frac{D_o n_i}{v_s} \int_{x_E}^{x_C} a(t)|\psi'(t)| e^{\psi(t)} dt \approx \frac{2a_m D_o n_i}{v_s} e^{\psi_m}$$

Approximation ($c$).

For an assessment of the relative magnitude of the terms in the denominator of EQUATION (17), consider that in a region of width $w$ the potential $\psi(x)$ does not differ markedly from $\psi_m$; such region is conventionally called the "base" of the transistor. Consider high current gain, i.e., a $\approx a_m \approx 1$. Then the value of the first integral is $w n_i e^{\psi_m}$, compared with $(2D_o/v_s) n_i e^{\psi_m}$ for the second.

The quantity $2D_0/v_s$ has length and is ≈200 A for silicon. This length is small compared to base widths of today's most advanced transistors and can be neglected. Conceivably, future transistors may have narrow enough bases that the term will have to be kept.

If in Equation (17) the carrier velocity was considered to be strictly proportional to the electric field that is $v_s \rightarrow \infty$, then approximation (d)

$$\frac{n_i D_o}{v_s} \int_{x_E}^{x_C} a(t)|\psi'(t)| e^{\psi(t)} dt \ll \int_{x_E}^{x_C} a(t) n_i e^{\psi(t)} dt$$

Approximation ($d$)

would be implemented automatically. Note, however, that in making Approximation (d) it is not implied that $v_s = \infty$, or that the essential consequences of the finiteness of $v_s$ are neglected. A low value of $v_s$ manifests itself in substantial base widening at high currents, i.e., in influencing $\psi(t)$ in the remaining (first) term in the denominator of Equation (17). In view of the idealized text-book treatments in which the minority carrier concentration at the base side of the collector depletion region is set equal to zero, rather than to a finite value, the following statement of Equation (17) may be of interest: For low injection, i.e., for currents sufficiently low that the base width is independent of current, the effect of the finiteness of the scattering limited velocity on the dc collector current is equivalent to a base widening of $2D_0/v_s$.

The next approximation is:

The value of the electron quasi-fermi level in the base is constant.

(Approximation (e)

A gradient in the electron quasi-fermi level in the region where electrons are majority carriers would cause appreciable electron current to flow; for transistors of reasonable current gain, such currents are negligible. Thus, ($e$) is very reasonable. This value of the electron quasi-fermi level may be denoted by $\phi_{nb}$, and the numerator and denominator of the right-hand side of Equation (17) may then be divided by exp ($\phi_{nb}$). The emitter-base and collector-base junction voltages can then be defined by $$V_{eb} = \frac{kT}{q} (\varphi_p(x_E) - \varphi_{nb}) \quad (18)$$

$$V_{cb} = \frac{kT}{q} (\varphi_p(x_C) - \varphi_{nb}). \quad (19)$$

These voltages differ from terminal voltages by ohmic drops, primarily lateral ohmic drops in the base region. The first integral in the denominator or Equation (17), after it is divided by exp ($\phi_{nb}$), contains very nearly the total area density of electrons.

$$\int_{x_E}^{x_C} n_i a(t)(e^{\psi(t)-\varphi_{nb}})dt = \int_{x_E}^{x_C} a(t) n(t) dt$$

Approximation ($f$)

The integrands outside the abase region differ, since there the quasi-fermi level is position dependent and does not equal $\phi_{nb}$, but the contribution to the integral outside of the base region is negligible. By defining an average value $a$ of $a$, $$\bar{a} = \frac{\int_{x_E}^{x_C} a(t) n(t) dt}{\int_{x_E}^{x_C} n(t) dt} \quad (20)$$

expression ($f$) may be written $$n_i \int_{x_E}^{x_C} a(t) e^{\psi(t)-\varphi_{nb}} dt = -\frac{\bar{a}}{q} q_b \quad (21)$$

where $q_b$ is the total charge, per unit area, of those mobile carriers associated with the base terminal, i.e., electrons in a p-n-p transistor. Equation (17) with Approximation (d) and (f) may be written $$j_c = -\frac{(q^2 D_o n_i^2/\bar{a})(e^{(qV_{eb}/kT)} - e^{(qV_{cb}/kT)})}{q_b} \quad (22)$$

Now, changing from current and charge densities to current and charge and choosing the sign of the collector current according to the convention that an electric current entering the device is positive:

$$I_c = -j_c A \quad (23)$$

$$Q_b = q_b A \quad (24)$$

where A is the device area. Note that the sign of $Q_b$ is such that an electric current flowing into the base tends to increase $Q_b$. This is the proper sign for charge control theory. Equation (22) can now be written $$I_c = \frac{(qn_iA)^2 D_a}{\bar{a}} \left[ \frac{\exp(qV_{eb}/kT) - \exp(qV_{cb}/kT)}{Q_b} \right] \quad (25)$$

The parameter $a$ in Equation (25), by its deviation from unity, accounts for recombination current or for those components of current that do not link the emitter and collector terminals. The dominant current, $I_{cc}$, which links the emitter and collector and which has been isolated in Equation (5) is contained in Equation (25) and can be approximated by making $a$ equal to unity and consolidating the coefficients outside the brackets of Equation (25) into the intercept current, $I_s$. The replacement for Equation (5) is thus $$I_{cc} = -I_s Q_{bo} \frac{\exp(qV_{eb}/kT) - \exp(qV_{cb}/kT)}{Q_b} \quad (26)$$

Note that $Q_b$ depends on bias, and that the form of the bias dependence is governed by the doping profile. However, the relation among the quantities $I_c$, $V_{eb}$, $V_{cb}$, and $Q_b$ in Equation (25) is independent of the details of the doping profile.

It is of interest to note that the Ebers-Moll equations embody superposition i.e., that the collector current can be expressed as the sum of a function of the emitter voltage and a function of the collector voltage. For real transistors violations of the superposition principle are easily observed. Consider, for example, the Early effect i.e., the dependence of the low-frequency output conductance on bias. As shown schematically in FIG. 1, a region of bias exists in which the collector current varies approximately linearly with collector-emitter voltage for fixed base current, in such a way that the straight-line sections, when extrapolated, intersect (approximately) at a negative voltage which we shall call the "Early voltage," $V_A$. For superposition to be valid, the lines would have to be nearly parallel to each other. The base charge $Q_b$ in the denominator of Equation (25) through its dependence on collector voltage via the collector capacitance disables superposition and provides a realistic description of the output conductance.

Figure 2:
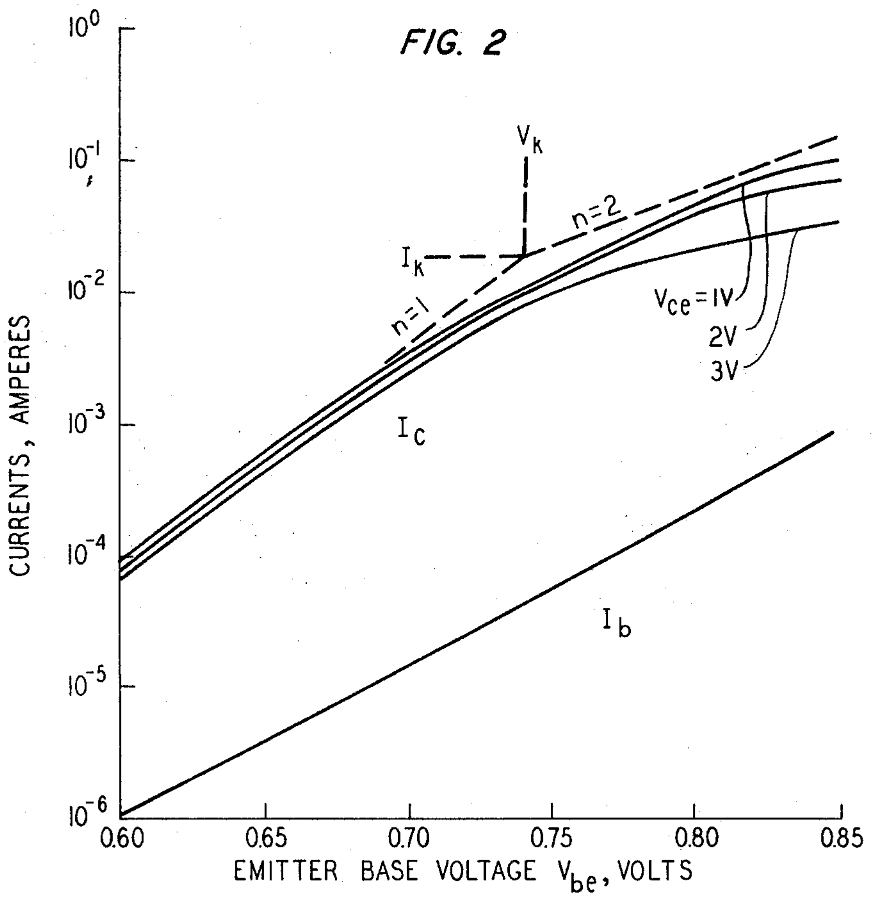
FIG. 2 is a plot of collector and base currents for three values of collector-emitter voltage versus base-emitter voltage for a transistor analyzed in an illustrative example of the process of this invention.

Another point of interest concerns high-injection effects in the base region. The "ideal" voltage dependence of $I_{cc}$ on $V_{eb}$ is caused primarily by the dependence of the minority carrier concentration in the base near the emitter as $\exp(qV_{eb}/kT)$. This dependence holds, however, only as long as the minority carrier concentration is small compared to the doping concentration. If the minority carrier (the word minority starts to lose its literal meaning here) concentration is large compared to the doping concentration, then it varies as $\exp(qV_{eb}/BKT)$, and so does, approximately, $I_{cc}$ except for additional complications due to base pushout. In FIG. 2, the intersection of the $n$=1 and $n$=2 asymptotes to $I_{cc}$ represent an important characteristic feature of the transistor. This shall hereinafter be called the "knee point" and its coordinates $V_k$ and $I_k$ will be used as model parameters and as a basis for normalizations.

Consolidating the development up to this point, the process, exclusive of parasitic effects is mathematically described by $$I_c = -I_s Q_{bo} \frac{\exp(qV_{eb}/kT) - \exp(qV_{cb}/kT)}{Q_b} + I_{bc} \quad (27)$$

$$I_b = -I_{be} - I_{bc}. \quad (28)$$

As discussed above, the base current components $I_{be}$ and $I_{bc}$ depend strongly on the recombination properties of the structure and are in practice not readily calculated from first principles. By contrast, the bias charge as a function of bias depends primarily on the doping profile and is nearly independent of recombination properties. Hence, given the doping profile, $Q_b$ as a function of $V_{eb}$ and $V_{cb}$ can be computed by existing techniques. However, for such a calculation considerable computer resources (memory and time) are required. For network analysis programs it is preferred to approximate $Q_b$ by simple algebraic or algorithmic (implicit functions) representations which, depending on complexity, can give reasonable accuracy. One such representation will now be given. Special features are use of a modified representation of junction capacitance which avoids the problem of an infinite capacitance when the junction voltage equals the built-in voltage, and use of a four-parameter representation of base push-out.

Mathematical Description of the Manner in Which the Process
Uses the Charge-Control Relation In this section a more detailed mathematical description of the general process as described by Equations (27) and (28) will be presented. The bias dependence of base charge and base current will be modeled. The polarity assumed is that of a pnp transistor.

The dominant current component $I_{cc}$ may be separated into an emitter and a collector component, or a forward and reverse component:

$$I_{cc} = -I_s Q_{bo} \frac{\exp(qV_{eb}/kT) - 1}{Q_b} + I_s Q_{bo} \frac{\exp(qV_{cb}/kT) - 1}{Q_b} \equiv -I_f + I_r. \quad (29)$$

The excess base charge may be expressed as consisting of emitter and collector capacitive contributions $Q_e$ and $Q_c$, and of forward and reverse current-controlled contributions, $$Q_b = Q_{bo} + Q_e + Q_c - \tau_f B I_f - \tau_r I_r, \quad (30)$$

where the minus sign arises because the base charge contains electrons neutralizing the positive charges $\tau_f B I_f$ and $\tau_r I_r$. $Q_b$, $Q_{bo}$, $Q_e$, and $Q_c$ are all negative quantities for positive $V_{eb}$ and $V_{cb}$. Here $\tau_f$ and $\tau_r$ are forward and reverse transit times. The coefficient $B$ has been included to describe the increase of the transit time when base push-out occurs; it has a value of unity in the absence of base push-out.

At this point it is convenient to normalize all charges in Equation (30) with respect to the zero bias charge $Q_{bo}$, to denote the normalized charges by lower-case symbols, and to replace $I_f$ and $I_r$ according to Equation (29). Then $$q_b = 1 + q_e + q_c + \frac{1}{q_b}\left(\frac{I_s}{-Q_{bo}}\{\tau_f B[\exp(qV_{eb}/kT) - 1] + \tau_r[\exp(qV_{cb}/kT) - 1]\}\right)$$

$$= q_1 + \frac{1}{q_b}(q_2) \quad (31)$$

Multiplication of Equation (31) by $q_b$ removes $q_b$ from the denominator of the last term on the right-hand side of Equation (31) and gives rise to a quadratic equation in $q_b$. Its solution gives $q_b$ explicitly in terms of the junction voltages, except for a possible $q_b$-dependence of B:

$$q_b = \frac{q_1}{2} + \sqrt{\left(\frac{q_1}{2}\right)^2 + q_2}. \quad (32)$$

The term $q_1$ represents the sum of the zero-bias charge and the charge associated with the junction capacitances; $q_2$ represents the excess base charge, or the current-dependent charge associated with diffusion capacitances. The latter charge contains a dependence on the base push-out effect through the parameter $B$ which is explained later in this development.

For high forward bias the charge $q_2$ is the dominant component of the base charge $q_b$. Except for the base push-out term $B$, it is characterized by four parameters: $I_s$, $Q_{bo}$, $\tau_f$, and $\tau_r$. It will be convenient to also normalize these parameters. For this, the knee voltage $V_k$ is defined as the emitter voltage for which $q_2$ equals unity (for zero collector voltage and neglecting terms small compared to the exponential of the emitter voltage):

$$V_k = \frac{kT}{q} \ln \frac{-Q_{bo}}{I_s\tau_f}. \quad (33)$$

The low-injection-extrapolated collector current for $V_{eb} = V_k$ is $$I_k = -Q_{bo}/\tau_f \quad (34)$$

It will be convenient to normalize all quantities having dimensions of current with respect to $I_k$, and to express voltages by their difference from $V_k$, in units of $kT/q$. Again lower-case symbols will be used for normalized quantities. Thus, $$v_k = \frac{qV_k}{kT} \quad (35)$$

$$v_e = \frac{qV_{eb}}{kT} - v_k \quad (36)$$

$$v_c = \frac{qV_{cb}}{kT} - v_k \quad (37)$$

$$e_k = \exp(-v_k). \quad (38)$$

With these normalizations, Equations (27) and (28) become $$I_c = I_k i_c = I_k\left(-\frac{e^{v_e} - e^{v_c}}{q_b} + i_{bc}\right) \quad (39)$$

$$I_b = I_k i_b = I_k(-i_{be} - i_{bc}). \quad (40)$$

The base charge is then $$q_2 = B(e^{v_e} - e_k) + \tau_r/\tau_f)\ (e^{v_c} - e_k) \quad (41)$$

$$q_b = q_1/2 + \sqrt{(q_1/2)^2 + q_2} \quad (42)$$

$$Q_b = -I_k\tau_f q_b. \quad (43)$$

With these normalizations, the set $I_k$, $v_k$, $\tau_f$, $r_t$ $\tau_f/\tau_r$ can be used as the four process parameters describing $q_2$ for the case $B = 1$. These four parameters constitute Group 1 of the process parameters listed in Table 1.

The charge contribution from the emitter and collector junction capacitances will be considered next. The conventional representation of junction capacitance is through an expression containing three parameters:

$$C = \frac{\text{const}}{(V - V_{built\text{-}in})^m} \quad (44)$$

The parameters are $V_{built\text{-}in}$ (which for silicon is typically $\approx 0.7V$), the grading coefficient $m$, and the constant in the numerator which can be related to the zero-bias capacitance. This expression causes difficulties when the junction voltage $V$ approaches the built-in voltage and $C$ goes to infinity. In a real transistor, of course, a finite amount of charge is stored for all bias conditions, and the derivatives of charge with respect to junction voltages are finite. Equation (44) can be modified so as to be free of singularities by the introduction of a fourth parameter which relates to the forward-bias capacitance inferred from measurements of transit time versus emitter current.

Rather than modeling the capacitance directly, it is convenient to model the voltage integral of capacitance, i.e., the capacitively stored charge. In terms of the normalized voltage $$x = V - V_1/V_1, \quad (45)$$

Equation (44) may be written $$C_e = C_o/(-x)^n, \quad (46)$$

where $C_o$ is the capacitance at zero bias. The capacitively stored charge, $Q_c$, may be written as $$Q_c = \frac{C_0 V_1}{1 - n}\left[1 + \frac{x}{(-x)^n}\right]. \quad (47)$$

Equation (47) may now be modified as follows:

$$Q_c = \frac{C_0 V_1}{1 - m}\left[\frac{1}{(1 + b)^{m/2}} + \frac{x}{(x^2 + b)^{m/2}}\right], \quad (48)$$

where $b$ is an adjustable parameter. This parameter $b$ is positive and is typically small compared to unity. $C$ is no longer the zero bias capacitance but differs negligibly from it when $b$ is small. It is seen by inspection that the values for $Q_c$ resulting from Equations (47) and (48) for large (compared to $\sqrt{b}$) negative $x$, i.e., for low forward and reverse bias, differ negligibly. The capacitance obtained from differentiating Equation (48) with respect to voltage is $$C_e = \frac{C_0}{(x^2 + b)^{m/2}}\left(1 + \frac{m}{1 - m}\frac{b}{x^2 + b}\right) \quad (49)$$

Again, for reverse and small forward bias Equations (46) and (49) differ negligibly. For $V = V_1$ however, Equation (49) remains finite and gives the capacitance $$C_e = \frac{C_0}{(1-m)b^{m/2}},\ V = V_1. \quad (50)$$

Figure 6:
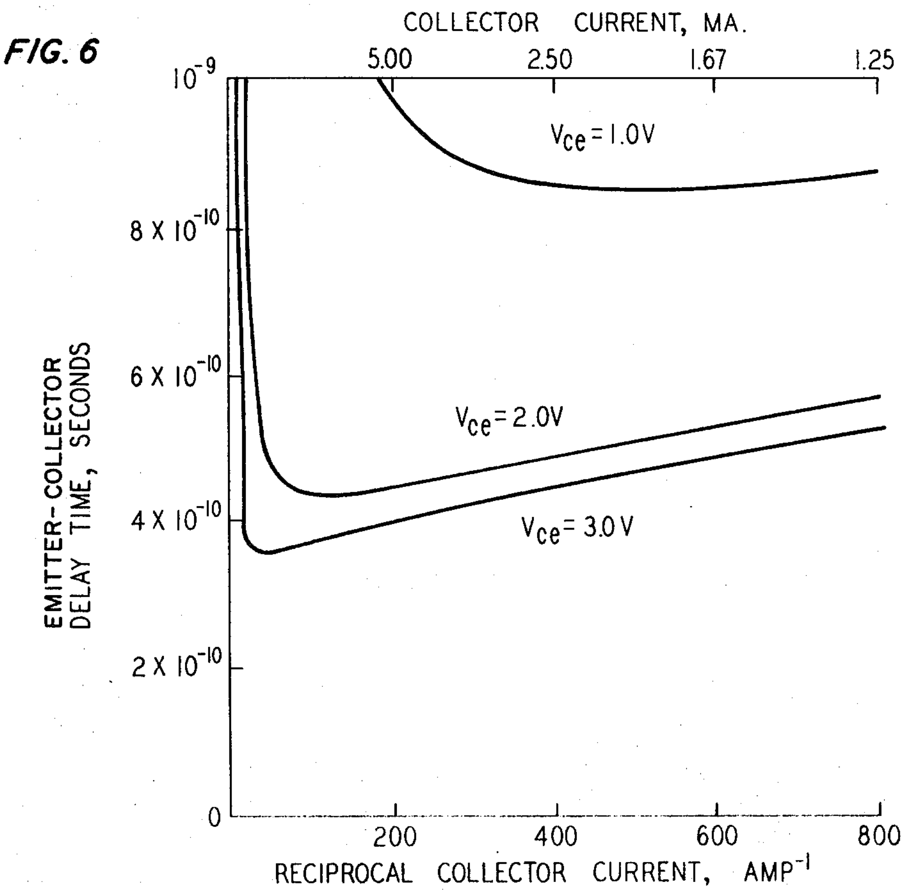
FIG. 6 is a plot of the illustrative transistor's emitter-collector delay time versus both collector current and reciprocal collector current for three values of emitter-collector voltage.

Equation (50) is the maximum value of the capacitance; for voltages above $V_1$ the capacitance decreases. Denote by $C_{ef}$ the high-forward bias value of capacitance that may be deduced from a delay-time vs. reciprocal emitter current plot as shown in FIG. 6 in a manner well known to those skilled in the art of transistor analysis. It is recommended that the parameter b be adjusted so that the capacitance in Equation (50) equals $rC_{ef}$ where $r$ is a numerical coefficient approximately equal to unity, the exact value depending on doping profile. Then $$b = \left[\frac{(1-m)rC_{ef}}{C_0}\right]^{-2/m} \quad (51)$$

For compactness of notation and for implementing desirable normalizations, the four parameters of Equation (49) may be expressed, as is explicitly shown in the section of this specification summarizing the parameters used by the process, as elements $P_1, p_2, p_3$, and $p_4$ of a four dimensional vector $P$. Defining the function $$f(v, P) = p_3 \quad \frac{1}{(1+p_4)^{p_2}} + \frac{\frac{v}{p_1} - 1}{\left[\left(\frac{v}{p_1} - 1\right)^2 + p_4\right]^{p_2}} \quad (52)$$

gives the following expressions for the normalized emitter and collector charges:

$$q_e = f\left(\frac{qV_{eb}}{kT}, P_e\right) \quad (53)$$

$$q_c = f\left(\frac{qV_{cb}}{kT}, P_c\right) \quad (54)$$

where $P_e$ and $P_c$ are the four-parameter vectors describing the emitter and collector junctions, respectively. These two vectors constitute Groups 3 and 4 of the model parameters listed in Table I. As discussed in the parameter summary section, some of the parameter values can be estimated or approximated in terms of other model parameters. In any case, these parameters are readily amenable to numerical evaluation from the device structure.

As previously mentioned, the recombination in transistors is best handled through a description of the base current as a sum of exponentials in the junction voltages. Pertinent parameters are pre-exponential factors and emission coefficients. For typical transistors the forward base current is adequately described by two components, one ideal ($n$=1) and the other nonideal ($n$=$n_e$). For the reverse base current a single nonideal ($n$=$n_c$) component is adequate.

Defining $$e_k = \exp(-v_k) \quad (55)$$

$$e_{ke} = \exp(-v_k/n_e) \quad (56)$$

and $$e_{kc} = \exp(-v_k/n_c) \quad (57)$$

the base current components become:

$$i_{be} = i_1\ (e^{v_e} - e_k) + i_2\ (e^{v_e/n_e} - e_{ke}) \quad (58)$$

$$i_{bc} = i_3\ (e^{v_c/n_c} - e_{kc})\,. \quad (59)$$

The quantities $i_1, i_2, i_3, n_c$ are the five parameters which characterize the recombination behavior of the transistor. They are listed as Group 2 in Table I.

The last set (Group 5) of the process parameters listed in Table I describes the base push-out effect. For its description four parameters are required.

The approach towards modeling the base push-out effect is guided by results obtained in a detailed analysis of this effect. Assuming constant resistivity $\rho$ in the collector region adjacent to the base (epitaxial region), the base push-out effect starts approximately at a collector current value $$I_1 = \frac{A_e(V_{oc} - V_{cb})}{\rho W_c} \quad (60)$$

where $A_e$ is the emitter area and $W_c$ is the width of the lightly doped collector region. Let $W_{eff}$ be the effective width of the base. For $I_c < I_1$, the effective base width is equal to the metallurgical base width, $W_b$, $$W_{eff} = W_b. \quad (61)$$

For $I_c > I_1$, the effective base width is approximately given by $$W_{eff} = W_b + W_c\left(1 - \frac{I_1}{I_c}\right). \quad (62)$$

Equations (61) and (62) can be written as $$W_{eff} = W_b + \frac{W_c}{2}\ \frac{\sqrt{(I_c+I_1)^2} - (I_c+I_1)}{I_c} \quad (63)$$

Equation (63) gives much too abrupt a transition for $W_{eff}$ from $W_b$ to $(W_b+W_c)$, and becomes numerically unstable when $I_c$ approaches zero. Hence, Equation (63) is modified with an additional parameter $I_2$, such that $$W_{eff} = W_b + \frac{W_c}{4}\ \frac{[\sqrt{(I_c+I_1)^2 + I_2^2} - (I_c+I_1)]^2}{I_c^2 + I_2^2} \quad (64)$$

The low-current forward transit time $\tau_f$ is to be modified by the square of the ratio of the effective base width to metallurgical base width, to give the total base transit time $\tau_{fb}$:

$$\tau_{fb} = \tau_f\left(\frac{W_{eff}}{W_b}\right)^2 \equiv \tau_f B \quad (65)$$

with $$B = \left\{1 + \frac{W_c}{4W_b}\ \frac{[\sqrt{(I_c+I_1)^2 + I_2^2} - (I_c+I_1)]^2}{I_c^2 + I_2^2}\right\}^2 \quad (66)$$

The quantity B may be expressed in terms of model parameters and the normalized collector current $i_c = I_c/I_K$ $$B=\left\{1+\frac{r_w}{4}\,\frac{[\sqrt{(i_c+i_1)^2+r_p}-(i_c+i_1)]^2}{i_c^2+r_p}\right\}^2 \qquad (67)$$

with $$r_w=\frac{W_c}{W_b}, \qquad r_p=\left(\frac{I_2}{I_K}\right)^2, \qquad (68)$$

and $$i_1=\frac{(V_{oc}-V_{cB})A_c}{pW_cI_K}=\frac{v_{oc}-v_K-v_c}{v_{rp}} \qquad (69)$$

So far, Equation (67) models effects in a one-dimensional transistor. Emitter crowding and carrier storage in the inactive base cause the transit time at high currents to increase more strongly than given by Equation (67). For a first-order modeling of emitter crowding the exponent 2 outside the square brackets is replaced by an adjustable model parameters $n_p$ ("push-out exponent"):

$$B=\left\{1+r_w\,\frac{[\sqrt{(i_c+i_1)^2+r_p}-(i_c+i_1)]^{n_p}}{4(i_c^2+r_p)}\right\}^2 \qquad (70)$$

The quantities $r_w$, $r_p$, $v_{rp}$, $n_p$, and $v_{oc}$ are process parameters (Groups 5 and 4).

Thus, as shown in Table 1, 21 parameters are used in the process. The following features are a consequence of the normalization used:

1. $I_k$ is proportional to the emitter area. All other parameters are, to first order, independent of area. Area scaling (neglecting complications caused by emitter crowding, etc.) is achieved simply by changing the value of $I_k$. This feature is particularly convenient for integrated circuit work, where transistors on a given slice differ only in their lateral dimensions.
2. For pnp transistors all model parameters have positive numerical values. For npn transistors two changes are required. (a) $I_k$ must be made a negative quantity; (b) the Boltzmann voltage $kT/q$ must be given a negative value (or the Boltzmann voltage is given the sign of $I_k$ for pnp's and npn's). When this is done, the polarity of terminal currents and voltages is in agreement with standard practice (currents positive if flowing into the device).
3. The offset voltages $V_{oe}$ and $V_{oc}$ used in modeling the capacitance charges are approximately proportional to the absolute temperature. Hence use of constant, i.e., temperature independent, values for the normalized quantities $v_{oe}$ and $v_{oc}$ implements automatically the temperature dependence of the offset voltages. The normalized knee voltage $v_k$ is not, to first order, temperature independent, but varies with temperature approximately as $$v_K(T)=v_K(T_o)+\frac{qV_g}{kT_o}\left(\frac{T_o}{T}-1\right) \qquad (71)$$

where $T_o$ is a reference temperature e.g., room temperature) and $V_g$ is the band-gap voltage (1.12 eV for silicon).

Summary of the Parameters and Equations of the Process

The parameters used by the process in the analysis of bipolar transistors are listed in Table 1.

TABLE 1

PROCESS PARAMETERS

Group 1 : Knee parameters and transit times
- $I_k$ Knee current (negative for npn transistor)
- $V_k$ Absolute value of knee voltage, in units of $kT/q$
- $\tau_f$ Forward tau (forward delay time)
- $r_t$ Tau ratio (ratio of reverse to forward delay time)

Group 2 : Base Current
- $i_1$ Ideal base current coefficient
- $i_2$ Nonideal base current coefficient
- $n_e$ Forward base current emission coefficient
- $i_3$ Reverse base current coefficient
- $n_c$ Reverse base current emission coefficient Group 3: Emitter Capacitance $P_e$:
- $v_{oe}$ Absolute value of emitter offset voltage, in units of $kT/q$
- $m_e$ Emitter grading coefficient
- $a_{e1}$ Emitter zero bias capacitance coefficient
- $a_{e2}$ Emitter peak capacitance coefficient Group 4: Collector Capacitance $P_c$:
- $v_{oc}$ Absolute value of collector offset voltage, in units of $kT/q$
- $m_c$ Collector grading coefficient
- $a_{c1}$ Collector zero bias capacitance coefficient
- $a_{c2}$ Collector peak capacitance coefficient Group 5: Base Push-out
- $v_{rp}$ Absolute value of base push-out reference voltage, in units of $kT/q$
- $r_w$ Effective base width ratio
- $r_p$ Base push-out transition coefficient
- $n_p$ Base push-out exponent Auxiliary Quantities
- $e_k = \exp(-v_k)$
- $e_{ke} = \exp(-V_k/n_e)$
- $e_{kc} = \exp(-v_k/n_c)$ The manner in which these parameters are related to standard parameters which are familiar to those having ordinary skill in the art of transistor analysis will now be discussed.

The parameters listed in Group 1 of Table 1 have previously been discussed in connection with Equations (33) through (43). These parameters are related to the conventional intercept current, commonly called the saturation current $I_s$, the base charge at zero bias $Q_{bo}$, and the nominal value of the low frequency approximation to the unity-current-gain frequency $f_L$ by the following equations:

$$I_k=\frac{-Q_{bo}}{\tau_f}, \qquad (72)$$

$$v_k=\ln\left(\frac{-Q_{bo}}{\tau_f I_s}\right), \qquad (73)$$

$$\tau_f=\frac{1}{2\pi f_L}. \qquad (74)$$

In terms of structural parameters $\tau_f$ is given approximately by $$\tau_f = \frac{w_b^2}{2\eta D} \tag{75}$$

where $w_b$ is the base width and where $\eta$ represents the drift effect in the base. $\eta$ is unity for uniform base doping and has typical values between 2 and 10 diffused-base transistors.

The zero-bias base charge is approximately given by $$Q_{bo} = -A_e q N_b \tag{76}$$

where $A_e$ is the emitter area, $q$ the electronic charge and $N_b$ the number of impurities per unit area in the base. Typical values for $N_b$ are a few times $10^{12}$ per $cm^2$ (lower values would cause premature punch through and high values cause low injection efficiency and/or low $f_L$). The intercept current is given by $$I_s = A_e \frac{q n_i^2 D}{N_b} = -\frac{A_e^2 q^2 n_i^2 D}{Q_{bo}} \tag{77}$$

where $n_i$ is the intrinsic carrier concentration and $D$ is the effective diffusivity of carriers in the base. Substituting Equations (75), (76), and (77) into Equation (73) gives:

$$v_k = 2 \ln \frac{N_b/w_b}{n_i} + \ln 2\eta \tag{78}$$

The Group 2 parameters along with the auxiliary quantities of Table 1 determine the current gain of the transistor. The interrelationships between these quantities have been defined in Equations (55) through (59). The actual values used for the Group 2 parameters may be obtained from an actual transistor by well-known techniques.

The Group 3 parameters describe the emitter junction capacitance. The offset voltage $V_{oe}$ is approximately the conventional "built-in" voltage, which has a typical value near 0.7 volts for silicon at room temperature, or $v_{oe} = V_{oe}/(kT/q) = 27$. The grading coefficient $m_e$ depends on the type of doping transition: it is one-fourth and one-sixth for ideal step and linearly graded junctions respectively. Typical values for emitter junctions are in the neighborhood of 0.2. Parameter $a_{e1}$ is related to the zero-bias capacitance $C_{oe}$ by $$a_{e1} = \frac{C_{oe} V_{oe}}{Q_{bo}(1-2m_e)}. \tag{79}$$

If the emitter junction is assumed to be a step junction and the base doping to be uniform, and if the base doping and base width are expressed in terms of the number of impurities per $cm^2$ in the base, $N_b$, and in terms of $f_L$, then an approximate formula for $a_{e1}$ may be derived to be $$a_{e1} = \frac{1}{(1-2m_e)} \left(\frac{\pi \epsilon^2 V_{oe}^2}{4q^2 D}\right)^{1/4} \frac{(f_L)^{1/4}}{(N_b)^{1/2}} \tag{80}$$

$$= A \frac{(f_L/10^9 \text{ Hz.})^{1/4}}{(N_b/5 \times 10^{12} \text{ cm.}^{-2})^{1/2}} \tag{81}$$

where $\epsilon$ is the dielectric constant and $D$ the diffusivity of electrons (holes) in an npn (pnp) transistor. For a silicon npn transistor, the numerical value for A based on Equation (80) is 0.147. For an actual double diffused transistor of $f_L$=400 MHz, the value of A obtained from parameter fitting was found to be 0.202.

The last parameter $a_{e2}$ in this group is related to the forward bias capacitance, $C_{ef}$, deduced from the slope of delay time versus reciprocal emitter current by $$a_{e2} = \left[\frac{(1-2m_e) r C_{ef}}{C_{oe}}\right]^{-m_e} \tag{82}$$

where $r$ is a numerical coefficient approximately equal to unity, the exact value depending on the doping profile. Typical values for $a_{e2}$ range between $10^{-2}$ to $10^{-3}$. If emitter capacitance effects are not of importance in a particular implementation of the process, the following default values are suggested:

$$v_{oe} = 27. \quad \text{(silicon)} \tag{83}$$

$$m_e = 0.2 \tag{84}$$

$$a_{e1} = 0.2 \frac{(f_L/10^9 \text{ Hz.})^{1/4}}{(N_b/5 \times 10^{12} \text{ cm.}^{-2})^{1/2}} \tag{85}$$

$$a_{e2} = 3 \times 10^{-3}. \tag{86}$$

The Group 4 parameters describe the collector junction capacitance. The parameters $v_{oc}$, $m_c$, $a_{c1}$ and $a_{c2}$ have similar meanings as their counterparts in the emitter junction capacitance. Typical default values (for silicon transistors) for $v_{oc}$, $m_c$, and $a_{c2}$ are $$v_{oc} = 27. \quad \text{(silicon)} \tag{87}$$

$$m_c = 0.15 \tag{88}$$

$$a_{c2} = 10^{-3}. \tag{89}$$

The parameter $a_{c1}$ may be related to the output characteristics of the transistor in the following manner. The previously defined Early voltage is of magnitude comparable to that of the punch-through voltage $V_T$, defined as that voltage for which the charge associated with collector capacitance, $Q_{cc}$, equals minus $Q_{bo}$. Denoting the coefficient relating the Early voltage and the punch-through voltage by $r_A$, $$V_T = r_A V_A. \tag{90}$$

Then $a_{c1}$ is given in terms of the Early voltage by $$a_{c1} = \frac{1}{\left(\frac{r_A V_A - V_{oc}}{V_{oc}}\right)^{1-2m_c} - 1}. \tag{91}$$

The exact value of $r_A$ depends on details of the doping profile and on the region in the $I_c$ vs. $V_{ce}$ domain from which the Early voltage is extrapolated; a typical value of $r_A$ is 1.7. Thus, given the Early voltage and the other group 4 parameters, Equation (91) is convenient for estimating $a_{c1}$. It should be noted that $a_{c1}$ refers to the collector capacitance of the intrinsic transistor. The terminal collector capacitance will be dominated by that of the inactive base region.

The Group 5 parameters model the base push-out effects. $V_{rp}= (kT/q)v_{rp}$ is the resistive voltage drop across the collector, caused by a current of magnitude $I_K$. The ratio of the width of the collector epitaxial region to the width of the metallurgical base is designated $r_w$. The parameter $r_p$ determines the steepness of the variation of the forward delay time as a function of a collector current in the current range where base push-out is incipient. The base push-out exponent $n_p$ determines the fall-off of $f_t$ for high currents. For $n_p= 2$, $f_t$ has a tendency to level off after it has decreased from its maximum value by a factor of $(1 + r_w)^2$. For $n_p> 2$, the decrease continues beyond this level. If the base push-out effect is not of importance in a particular implementation of the process the following default values may be used:

$$v_{rp}= 18.2 \qquad (92)$$

$$r_w= 10.0 \qquad (93)$$

$$r_p=4.55 \qquad (94)$$

$$n_p=3.0 \qquad (95)$$

The mathematical description of the process is summarized in Table 2.

TABLE 2

PROCESS EQUATION SUMMARY $$f(v, P)=p_3\left\{\frac{1}{(1+p_4)^{p_2}}+\frac{(v/p_1-1)}{[(v/p_1-1)^2+p_4]^{p_2}}\right\} \qquad (S1)$$

$$i_{be}=i_1(e^{v_e}-e_K)+i_2(e^{v_e/n_e}-e_{Ke}) \qquad (S2)$$

$$i_{bc}=i_3(e^{v_c/n_c}-e_{Kc}) \qquad (S3)$$

$$i_b=-i_{be}-i_{bc} \qquad (S4)$$

$$i_4=i_c+(v_{oc}-v_c-v_K)/v_{rp} \qquad (S5)$$

$$B=\left\{1+r_w\frac{[\sqrt{i_4^2+r_p}-i_4]^{n_p}}{4\,(i_c^2+r_p)}\right\}^2 \qquad (S6)$$

$$q_1=1+f\,(v_e+v_K, P_e)+f\,(v_c+v_K, P_c) \qquad (S7)$$

$$q_2=B\,(e^{v_e}-e_K)+r_t\,(e^{v_c}-e_K) \qquad (S8)$$

$$q_b=q_1/2+\sqrt{(q_1/2)^2+q_2} \qquad (S9)$$

$$i_c=-\frac{e^{v_e}-e^{v_c}}{q_b}+i_{bc} \qquad (S10)$$

These are the equations used by the process to compute the output quantities from the input quantities through the use of the parameters listed in Table 1. The following features of the process are of interest:

1. For low bias so that $Q_b$ is nearly equal to $Q_{bo}$ (or $q_b\approx 1$) and with the choice $n_e = n_c= 1$, the model reduces to the Ebers-Moll model.
2. Superposition, which is operative in the Ebers-Moll equations, is disabled through the base-charge denominator $Q_b$ in Equation (1). The dependence of $Q_b$ on collector voltage produces a finite output conductance, i.e., the Early effect.
3. The rapid increase of $Q_b$ when base push-out occurs causes fall-off of current gain and frequency response.
4. If an effective emission coefficient, $n$, is defined by $$\frac{1}{n}\equiv\frac{kT/q}{I_c}\left.\frac{dI_c}{dV_{eb}}\right|_{V_{cb}=\text{const}}, \qquad (96)$$

then it is seen that for the process, $n$ varies from approximately unity at low currents to approximately two at high currents (and larger values when base push-out occurs). The shift to a value of two represents high injection effects. The $n = 1$ and $n = 2$ asymptotes intersect approximately at $I_c= I_K$ and $V_{eb}= V_K$. If an emitter capacitance, $C_e$, is defined by $$C_e=\left.\frac{dQ_e}{dV_{eb}}\right|_{V_{cb}-\text{const}}, \qquad (97)$$

then the effective emission coefficient at low current values, where the current contribution to $Q_b$, Equation (29), is negligible, is given by $$n=1+\frac{(kT/q)C_e}{Q_{bo}}. \qquad (98)$$

If the transistor is used in a common emitter configuration it may be useful to define the effective emission coefficient as in Equation (97), but with $V_{ce}$ instead of $V_{cb}$ held constant. For this case, the emitter capacitance $C_e$ in Equation (98) should be replaced by the sum of emitter and collector capacitances. Thus, small deviations from the ideal exponential law are caused by the emitter capacitance. These deviations are present even at low forward currents. In principle, Equation (98) could be used to obtain the emitter capacitance from a dc semilog plot of $I_c$ vs. $V_{eb}$. However, very accurate temperature control would be required.

5. For currents low enough such that base widening effects are negligible, the emitter-collector delay time $\tau_d$ for common emitter operation is given by $$\tau_d=\left.\frac{dQ_b}{dI_c}\right|_{V_{ce}=\text{const}}=\frac{\tau_f+\frac{kT}{q}\frac{(C_e+C_c)}{I_c}}{1-\frac{kT}{q}\frac{(C_e+C_c)}{Q_b}}. \qquad (99)$$

At low current values, and for $C_c<< C_e$, the denominator of Equation (99) is approximately $1/n$, where $n$ is defined by Equation (98). Then the value of the emitter capacitance $C_e$ may be obtained from the slope $n(kT/q)C_e$ of a plot of delay time $\tau_d$ versus reciprocal collector current. It is this forward-bias emitter capacitance that may be used to set the parameter $a_{e2}$.

It can be seen from the above discussion that the process can be considerably simplified by the use of default values; example of this for both the emitter capacitance and base push-out effects have been given. This simplification can be carried even further in those cases where some sacrifice in accuracy can be tolerated in return for having to specify only a few key parameters. In fact, the process will produce generally satisfactory results if the following five quantities are provided: $I_k$(proportional to emitter area); the Early voltage $V_A$; maximum $\beta$ (at some collector voltage, e.g., $V_{ce}$= 5 volts); maximum $f_L$(at the same collector voltage); and the collector current at which the maximum $f_L$occurs. These values may then be used along with the default values shown in Table 3.

TABLE 3

Default Parameter Values

Group 1
$v_k = 28.7$
$r_t = 10.0$
Group 2
$i_1 = 2.35\times10^{-4}$
$n_e = 1.5$
$i_3 = 10 i_2$
$n_c = 1.5$
Group 3
$v_{oe} = 27.0$
$m_e = 0.20$
$a_{e2} = 3.0\times10^{-3}$
Group 4
$v_{oc} = 27.0$
$m_c = 0.15$
$a_{c2} = 1.0\times10^{-3}$
Group 5
$v_{rp} = 18.2$
$r_w = 10.0$
$r_p = 4.55$
$n_p = 3.0$ The default values of Table 3 are generally applicable to double-diffused silicon transistors with break-down voltages in the range 10 to 50 volts and current gain cut-off frequencies in the range 100 to 2,000 megahertz. Default values for other classes of transistors can be derived by those skilled in the art in accordance with the principles disclosed herein. It can be seen that parameters $a_{el}$, $a_{cl}$, $\tau_f$, and $i_2$are not listed in Table 3. These parameters must be separately computed because they are dependent upon the five quantities mentioned above. Parameters $a_{el}$and $a_{cl}$can be directly computed by means of Equations (85) and (91), respectively. Parameter $\tau_f$can be approximated by means of Equation (74). The value of $i_2$is determined by the specified value of $\beta$ and is found by iterating the three equations denoted (S2), (S4), and (S10) in Table 2 in the well-known manner until a value of $i_2$is found that satisfies all three equations.

Illustrative Example of a Typical Use of the Process

FIGS. 2 through 7 show the type of information that the process is capable of generating. These figures represent, in graphical form, the transistor characteristics of interest to general circuit analysis programs. The data for these FIGS. was obtained by using the parameter values listed in Table 4 in accordance with the machine implementation of the process which is described in the next section of this specification.

TABLE 4

Illustrative Example Parameter Values $I_k = -1.875\times10^{-2}$ amps
$V_k = 28.7$
$\tau_f = 3.2\times10^{-10}$ secs.
$r_t = 10.0$
$i_1 = 2.35\times10^{-4}$
$i_2 = 2.10\times10^{-3}$
$n_e = 1.5$
$i_3 = 7.65\times10^{-3}$
$n_c = 1.5$
$v_{oe} = 27.0$
$m_e = 0.24$
$a_{el} = 0.337$
$a_{e2} = 1.03\times10^{-2}$
$v_{oc} = 27.0$
$m_c = 0.1265$
$a_{cl} = 0.187$
$a_{c2} = 7.17\times10^{-3}$
$v_{rp} = 18.2$
$r_w = 10.0$
$r_p = 4.55$
$n_p = 3.0$ FIG. 2 is a semilog plot of collector and base voltage versus emitter-base voltage for $V_{ce}$values of 1, 2, and 3 volts. Also shown are the slopes corresponding to values of 1 and 2 for the emission coefficient $n$ and the "knee" point ($V_k$,$I_k$). It should be noted that the process must be performed once for each point in FIG. 2. That is, $V_{ce}$is held constant while $V_{be}$is sequentially changed. For each new $V_{be}$value the corresponding $I_c$-value is obtained.

Figure 3:
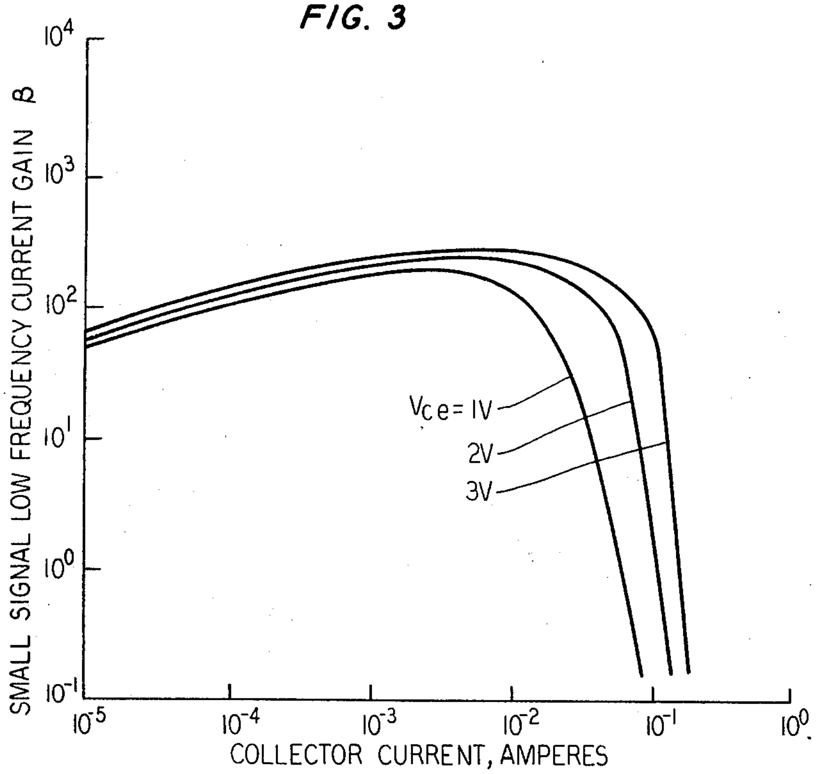
FIG. 3 shows the manner in which the small-signal low-frequency current gain, $\beta$, of the illustrative transistor varies with collector current for three values of collector-emitter voltage.

FIG. 3 shows common-emitter low-frequency current gain $\beta$ versus collector current for various collector voltages. The points on these curves were obtained by computing, after each execution of the process, the value of the ratio of Equation (S4) divided by Equation (S10).

Figure 4:
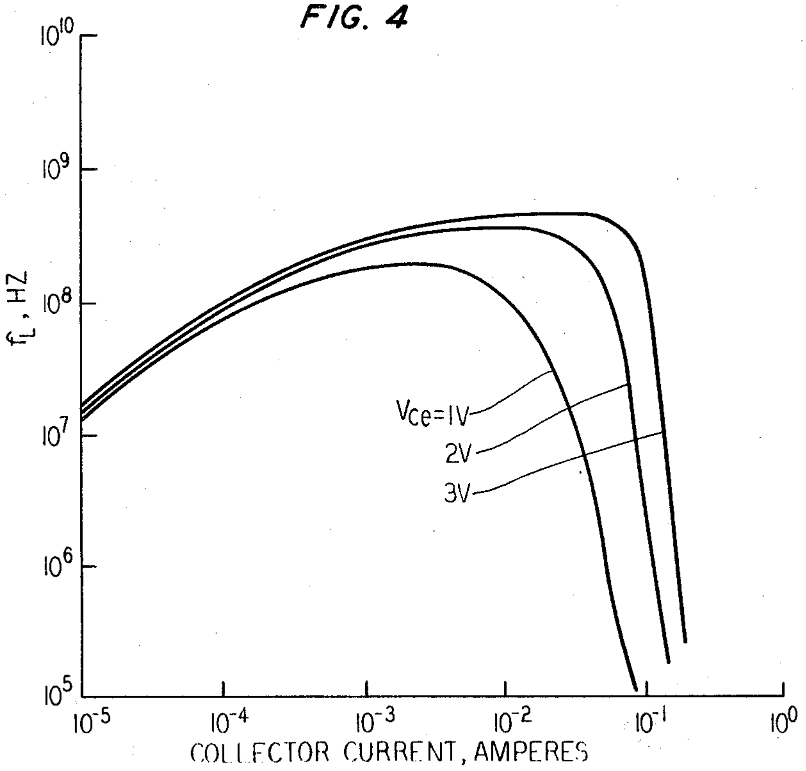
FIG. 4 is a graph of the illustrative transistor's $f_L$ versus collector current characteristics for three values of collector-emitter voltage.

FIG. 4 shows $f_L$versus collector current for three values of collector-emitter voltage. The parameter $f_L$, the low-frequency approximation to the unity-gain frequency, is a convenient way of characterizing the frequency dependence of the transistor. In fact, for high-current-gain transistors in the active region, $f_L$is synonymous with the conventional cut-off frequency, $f_T$.

Figure 5:
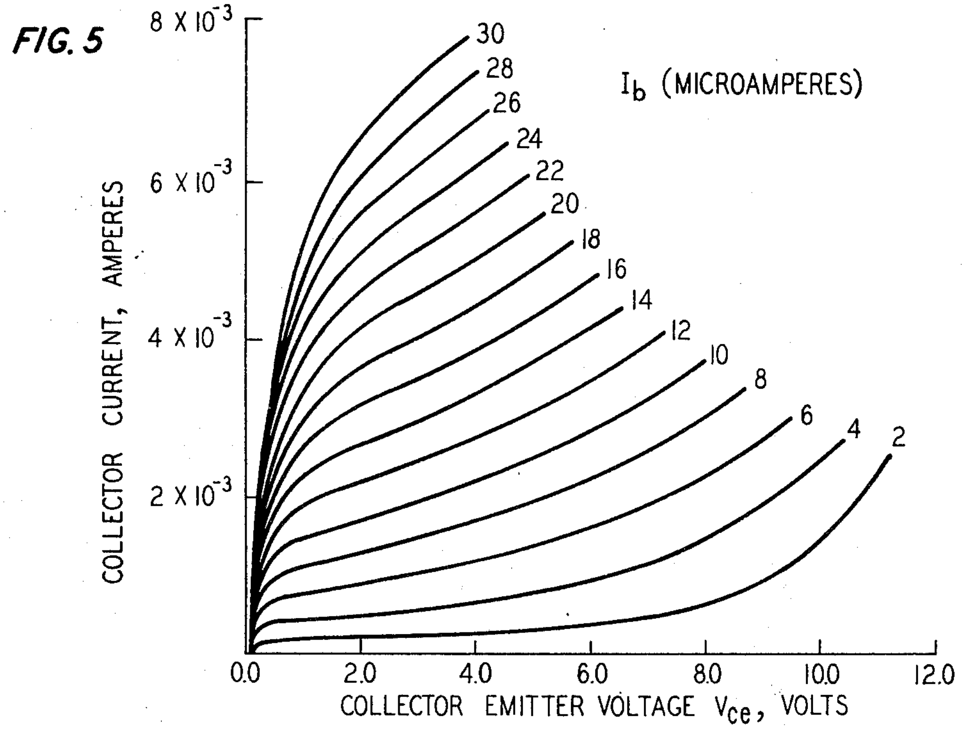
FIG. 5 shows the manner in which the illustrative transistor's collector current varies with collector-emitter voltage for various values of base current.

FIG. 5 shows a family of $I_c$versus $V_{ce}$characteristics, with $I_b$as a parameter. It should be noted that these curves do not exhibit the unrealistic flattening produced by the Ebers-Moll equation simulation.

Figure 7:
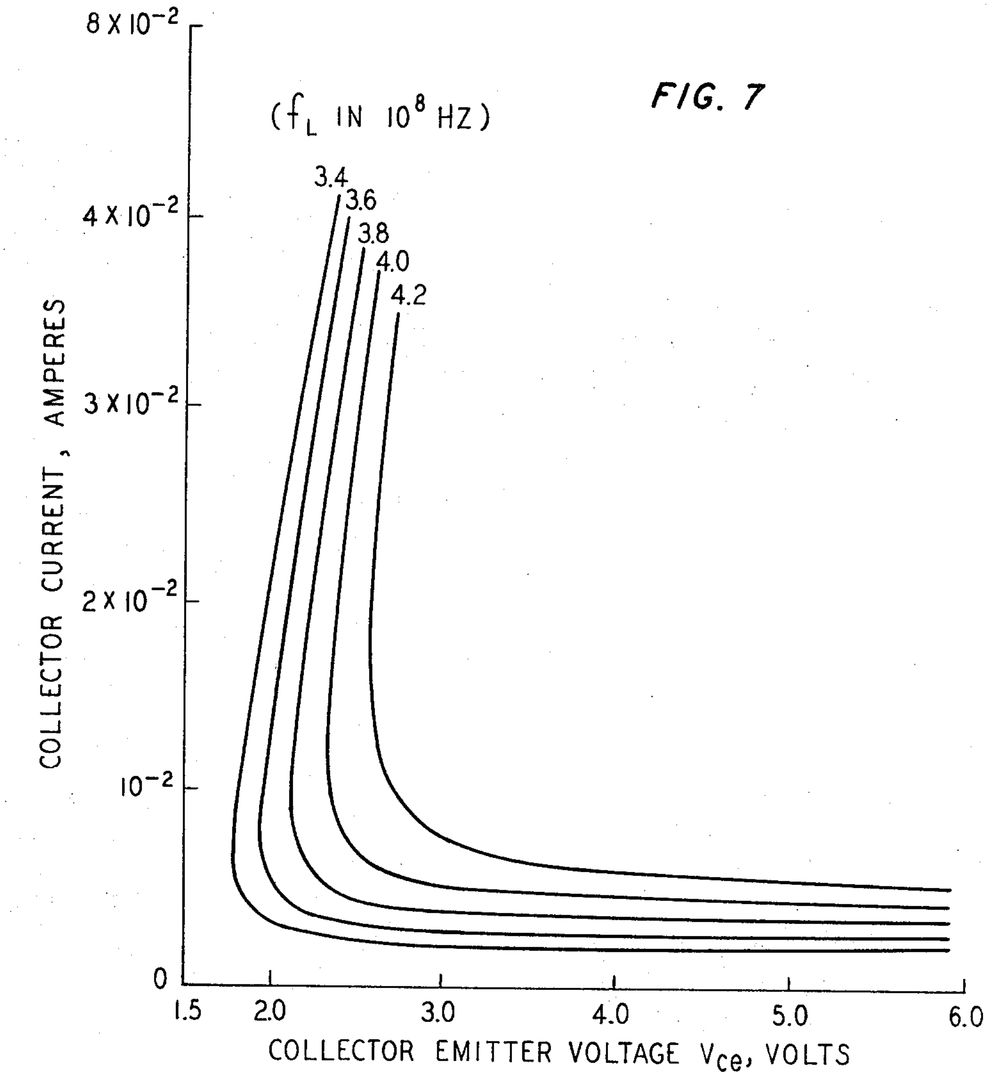
FIG. 7 depicts contours of constant $f_L$ in the collector-emitter voltage, collector-current plane derived from the transistor analysis of the illustrative example.

FIG. 6 presents the emitter-collector delay time versus reciprocal collector current for three values of collector-emitter voltage while FIG. 7 represents the same information displayed as $f_L$contour plots.

MACHINE IMPLEMENTATION OF THE PROCESS

The novel apparatus and process comprising this invention are described by the digital computer program listing shown in pages A1 through A4 of the Appendix. This program listing, written in FORTRAN IV, is a description of the set of electrical control signals that serve to reconfigure a suitable general purpose digital computer into a novel machine capable of performing the invention. The steps performed by the novel machine on these electrical control signals in the general purpose digital computer comprises the best mode contemplated to carry out the invention.

Figure 8:
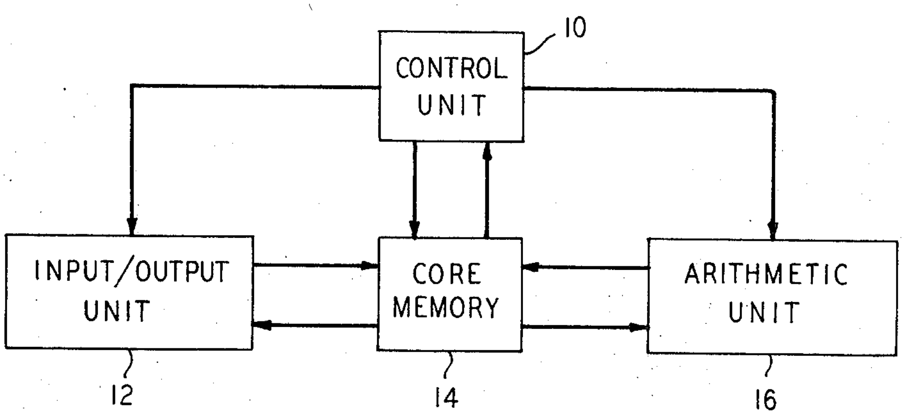
FIG. 8 is a block diagram of a general-purpose digital computer that can be used to practice this invention.

The process can be practiced by using any general-purpose digital computer of the type, as shown in FIG. 8, having a control unit 10, an input/output unit 12, a core memory 14, and an arithmetic unit 16. A specific example of such a general-purpose digital computer is an IBM System 360 Model 65 computer equipped with the OS/360 FORTRAN IV compiler as described in the IBM manual. *IBM System*/360 *FORTRAN IV Language — Form C*28–6515–7. Another example is the GE–635 computer equipped with the GECOS FORTRAN IV compiler as described in the *GE* 625/635 *FORTRAN IV Reference Manual, CPB*–1006*G*.

It can be seen that the program listing in the Appendix has the form of a subroutine which has three internal subroutines of its own. Although the particular form is immaterial, the subroutine form makes the process easier to incorporate in a general circuit analysis program.

The program listing is more readily understood with the aid of the flowcharts of FIGS. 9A, 9B, 9C, and 9D. These flow charts can be seen to include two different symbols. The oval symbols are terminal indicators and signify the beginning and end of a subroutine. The rectangles, termed "operation blocks," contain the description of a particular detailed operational step of the process.

Figure 9A:
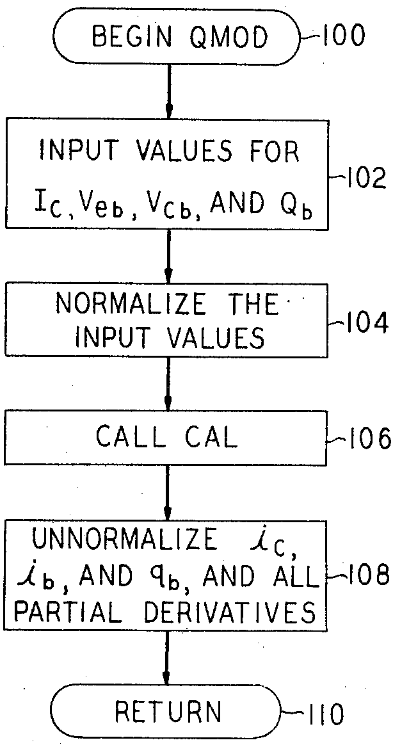
FIGS. 9A, 9B, 9C, and 9D are flow charts that are descriptive of the process of the present invention.

As shown in FIG. 9A, the main subroutine, herein called QMOD, is entered at terminal 100. Its first action, block 102, is to read in the process input values. The values are then normalized in block 104 in accordance with the previous discussion by dividing $I_c$, $V_{eb}$, and $V_{cb}$ by $I_k$ and by dividing $Q_b$ by $Q_{bo}$. Block 106 calls subroutine CAL to perform the calculations required to practice the process in accordance with the equations summarized in Table 2.

Figure 9B:
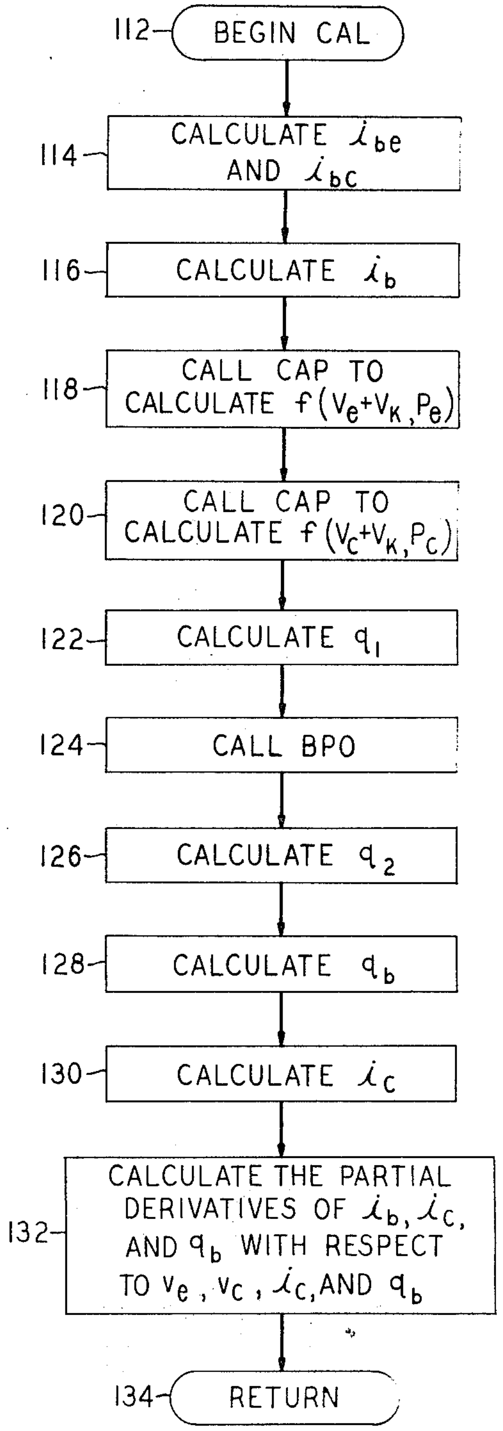

Subroutine CAL, shown in FIG. 9B, is entered at terminal 112 and first computes, block 114, $i_{be}$ and $i_{bc}$, by using Equations (S2) and (S3). These values are then used in block 116 to find $i_b$ as defined by Equation (S4). Block 118 calls subroutine CAP to calculate the function defined by Equation (S1) for the Group 3 parameters of Table 1.

Figure 9C:
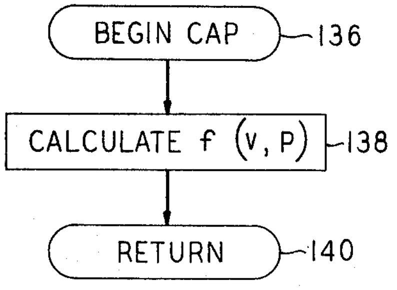

Subroutine CAP, shown in FIG. 9C, is entered at terminal 136. Block 138 computes Equation (S1) according to the particular values of its two arguments, a value of $v$ and a four valued P vector. Terminal 140 ends subroutine CAP and returns control to the calling program.

Block 120 of subroutine CAL again calls subroutine CAP, this time to calculate Equation (S1) for the P vector of the Group 4 parameters of Table 1. Block 122 then uses the values returned by the two subroutine calls to CAP to compute $q_1$ using Equation (S7).

Figure 9D:
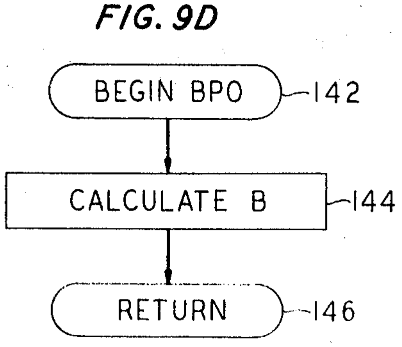

Next, block 124 calls subroutine BPO, shown in FIG. 9D. This subroutine is entered at terminal 142. Block 144 calculates B according to Formula (S6) and terminal 146 returns control to subroutine CAL.

Block 126 of subroutine CAL then uses the value returned by subroutine BPO in Equation (S8) to calculate $q_2$. Block 128 then uses the results of the operations of blocks 122 and 126 to find $q_b$ as defined by Equation (S9). Block 130 then determines the value of $i_c$ by using Equation (S10). Finally, the partial derivatives of the normalized output values $i_b$, $i_c$, and $q_b$ are found with respect to each of $v_e$, $v_c$, $i_c$, and $q_b$ by block 132. As previously described, these calculations are performed to provide a means for the program that called QMOD to evaluate the results. Terminal 134 returns control to QMOD.

Block 108 of QMOD unnormalizes the output values and their partial derivatives, and terminal 110 returns control to the calling program.

What is claimed is:

Appendix (A1)

```
 FORTRAN
 SUBROUTINE QMOD (N,QIN,QOUT)
 DIMENSION P(50),E(30),D(30),V(30),W(30),IR(50),RI(50),DEF(50)
 DIMENSION QIN(4),QOUT(13),STP(50,12),SYM(50),NS(3),BZ(3)
 DIMENSION REST(4)
 EQUIVALENCE (RI(1),IR(1))
 DATA TITTRA/3HTRA/
 DATA TITF /6HFINISH/
 DATA (DEF(J),J=1,4)/1.0E-2,28.7,4.0E-10,10.0/
 DATA (DEF(J),J=5,9)/1.0E-3,2.0E-3,1.5,2.0E-2,1.5/
 DATA (DEF(J),J=10,13)/27.0,0.25,3.37E-1,1.0E-2/
 DATA (DEF(J),J=14,17)/27.0,0.15,1.87E-1,5.0E-3/
 DATA (DEF(J),J=18,21)/18.0,10.0,4.6,3.0/
 DATA (DEF(J),J=22,27)/10.0,10.0,100.0,5.0,5.0,0.0258512/
 DATA SYM(1)        /24H    IK     VK    TAU   RTAU/
 DATA SYM(5)        /30H    I1     I2     NE     I3     NC/
 DATA SYM(10) /24H    VOE    ME    AE1    AE2/
 DATA SYM(14) /24H    VOC    MC    AC1    AC2/
 DATA SYM(18)         /24H    VRP     RW     RP     NP/
 DATA SYM(22)         /36H     RA     RB    RBP     RC    RCP   VOBO/
 DATA BZ(1)/18H                  /
1 FORMAT(A6)
2 FORMAT (1P5E15.7)
```

Appendix (A1) Continued

```
3 FORMAT (1H0,5X,6HSYMBOL,3(10X,A6,15HTRANSISTOR NO. ,I2))
4 FORMAT (1H1,5X,26HMODEL PARAMETERS STP ARRAY)
5 FORMAT (6X, A6,3(A6,4HSTP(,I2,1H,,I2,4H) = ,1PE15.7))
6 FORMAT (4(I5,1PE15.7))
  V(1)=QIN(1)/STP(47,N)-STP(2,N)
  V(2)=QIN(2)/STP(47,N)-STP(2,N)
  V(3)=QIN(3)/STP(1,N)
  V(4)=QIN(4)/STP(48,N)
  CALL CAL (STP(1,N),V,W)
  QOUT(1)=V(5)*STP(1,N)
  QOUT(2)=V(6)*STP(48,N)
  QOUT(3)=V(7)*STP(1,N)
  QOUT(4)=W(4)*STP(50,N)
  QOUT(5)=W(5)*STP(50,N)
  QOUT(6)=-W(6)/STP(3,N)
  QOUT(7)=W(1)*STP(49,N)
  QOUT(8)=W(2)*STP(49,N)
  QOUT(9)=-W(3)*STP(3,N)
  QOUT(10)=W(7)*STP(50,N)
  QOUT(11)=W(8)*STP(50,N)
  QOUT(12)=STP(24,N)/V(4)
  QOUT(13)=-QOUT(12)/QIN(4)
  RETURN
  ENTRY QMODP (STP,NUM)
  NUM=0
24 READ (5,1)TITLE
  IF (TITLE.EQ.TITF)  GO TO 30
  IF (TITLE.EQ.TITTRA)  GO TO 21
25 CALL READIT (5,RI,IR,2,NC,IFL)
  IF (NC.EQ.0)  GO TO 24
```

Appendix (A2)

```
  M=IR(1)
  DEF(M)=RI(2)
  GO TO 25
21 NUM=NUM+1
  DO 22 L=1,27
22 P(L)=DEF(L)
26 CALL READIT (5,RI,IR,2,NC,IFL)
  IF (NC.EQ.0)  GO TO 27
  M=IR(1)
  P(M)=RI(2)
  GO TO 26
27 CONTINUE
  P(31)=1.0/(1.0+P(13))**P(11)
  P(32)=P(12)/P(10)*(1.0-2.0*P(11))
  P(33)=P(13)*P(11)/(0.5-P(11))
  P(35)=1.0/(1.0+P(17))**P(15)
  P(36)=P(16)/P(14)*(1.0-2.0*P(15))
  P(37)=P(17)*P(15)/(0.5-P(15))
  P(38)=SIGN(1.0,P(1))
  P(39)=EXP(-P(2))
  P(40)=EXP(-P(2)/P(7))
  P(41)=EXP(-P(2)/P(9))
```

Appendix (A2) Continued

```
      P(42)=P(6)/P(7)
      P(43)=P(8)/P(9)
      P(44)=1.0/P(18)
      P(45)=P(14)-P(2)
      P(46)=0.25*P(19)
      P(47)=SIGN(P(27),P(1))
      P(48)=-P(1)*P(3)
      P(49)=P(48)/P(47)
      P(50)=P(1)/P(47)
      DO 17 JQ=1,50
   17 STP(JQ,NUM)=P(JQ)
      GO TO 24
   30 NU=NUM/3
      NR=NUM-NU*3
      ME=0
      KP=1
      IF (NU.EQ.0)  GO TO 31
      DO 32 K=1,NU
      IF (KP.EQ.1)  PRINT 4
      KP=1-KP
      DO 33 KX=1,3
   33 NS(KX)=ME+KX
      PRINT 3,(BZ(KX),NS(KX),KX=1,3)
      DO 35 L=1,27
   35 PRINT 5,SYM(L),BZ(1),L,NS(1),STP(L,ME+1),BZ(2),L,NS(2)
     1  ,STP(L,ME+2),BZ(3),L,NS(3),STP(L,ME+3)
   32 ME=ME+3
   31 IF (KP.EQ.1)  PRINT 4
      DO 34 J=1,3
   34 NS(J)=ME+J
      IF (NU.EQ.0)  PRINT 4
```

Appendix (A3)

```
   36 IF (NR.EQ.1)  PRINT 5,SYM(L),BZ(1),L,NS(1),STP(L,ME+1)
      RETURN
      PRINT 3,(BZ(KX),NS(KX),KX=1,NR)
      DO 36 L=1,27
      IF (NR.EQ.2)  PRINT 5,SYM(L),BZ(1),L,NS(1),STP(L,ME+1)
     1  ,BZ(2),L,NS(2),STP(L,ME+2)
      ENTRY COLCAP (N,VBC,CA,QC)
      VN=VBC/STP(47,N)
      CALL CAP (STP(14,N),VN,CA,QC)
      QC=-QC*STP(48,N)*STP(22,N)
      CA=-CA*STP(49,N)*STP(22,N)
      RETURN
      END
       FORTRAN
      SUBROUTINE CAL (P,V,W)
      DIMENSION P(50),V(30),W(30),DB(6)
      E1=EXP(V(1))
      E2=EXP(V(1)/P(7))
      E3=EXP(V(2)/P(9))
      E4=EXP(V(2))
```

Appendix (A3) Continued

```
XIBE=P(5)*(E1-P(39))+P(6)*(E2-P(40))
XIBC=P(8)*(E3-P(41))
V(7)=-XIBE-XIBC
V1=V(1)+P(2)
V2=V(2)+P(2)
CALL CAP (P(10),V1,CE,QE)
CALL CAP (P(14),V2,CC,QC)
HQ1=0.5*(1.0+QE+QC)
CALL BPO (P,V,B,DB)
Q2=B*(E1-P(39))+P(4)*(E4-P(39))
S=SQRT(HQ1*HQ1+Q2)
V(6)=HQ1+S
V3=(E1-E4)/V(4)
V(5)=-V3+XIBC
DIBDE=P(5)*E1+P(42)*E2
DIBDC=P(43)*E3
W(7)=-DIBDE
W(8)=-DIBDC
DQDC=DB(2)*(E1-P(39))+P(4)*E4
W(1)=0.5*(CE+(HQ1*CE+B*E1)/S)
W(2)=0.5*(CC+(HQ1*CC+DQDC)/S)
W(3)=0.5*DB(3)*(E1-P(39))/S
W(4)=-E1/V(4)
W(5)=E4/V(4)+DIBDC
W(6)=V3/V(4)
RETURN
END
 FORTRAN
SUBROUTINE CAP (P,V,CA,QC)
DIMENSION P(50)
X=V/P(1)-1.0
A1=1.0/(X*X+P(4))**P(2)
```

Appendix (A4)

```
QC=P(3)*(P(22)+X*A1)
CA=P(23)*A1*(1.0+P(24)/(X*X+P(4)))
RETURN
END
 FORTRAN
SUBROUTINE BPO (P,V,B,DB)
DIMENSION P(50),V(30),DB(6)
THE=V(3)+P(44)*(P(45)-V(2))
PHI=SQRT(THE*THE+P(20))
SET=V(3)*V(3)+P(20)
EX=(PHI-THE)**P(21)
SG=1.0+P(46)*EX/SET
B=SG*SG
SGP=2.0*SG*P(46)*EX/SET
DB(2)=SGP*P(21)*P(44)/PHI
DB(3)=-SGP*(P(21)/PHI+2.0*V(3)/SET)
RETURN
END
```

1. Apparatus for predicting certain performance characteristics of a transistor including means for determining collector currents for said transistor inversely dependent upon the values of the base charge on said transistor, and means for determining said base charge values from an explicit representation of the external bias applied to said transistor.

2. The apparatus of claim 1 further including means for determining the increase in forward transit time of said transistor due to base push-out from the relationship:

$$\left[B=\left\{1+r_w\frac{[\sqrt{i_4^2+r_p}+i_4]^{n_p}}{4\,(i_c^2+r_p)}\right\}^2\right]$$

$$B=1+r_w\frac{[\sqrt{i_4^2+r_p}-i_4]^{n_p 2}}{4\,(i_c^2+r_p)}$$

where $B$ is said increase in forward transit time; $r_w$ is the effective base width ratio; $r_p$ is the base push-out transition coefficient; $n_p$ is the base push-out exponent; $i_c$ is the normalized value of the collector current; and $i_4$ is defined by:

$$i_4=i_c+(v_{oc}-v_c-v_k)/v_{rp}$$

where $v_{oc}$ is the absolute value of collector offset voltage, in units of $kT/q$; $q$ is the magnitude of the electronic charge; $k$ is Boltzmann's constant; T is the absolute temperature; $v_c$ is the normalized value of the collector voltage; $v_k$ is the absolute value of the knee voltage; and $v_{rp}$ is the absolute value of the base push-out reference voltage.

3. The apparatus of claim 1 further including means for determining the capacitively stored charges of the emitter of said transistor from the relationship:

$$f(v,P)=p_3\left\{\frac{1}{(1+p_4)^{p_2}}+\frac{(v/p_1-1)}{[(v/p_1-1)^2+p_4]^{p_2}}\right\}$$

where $v$ is the built-in voltage of the emitter-base junction in units of $kT/q$; $q$ is the magnitude of the electronic charge; $k$ is Boltzmann's constant; $T$ is the absolute temperature; and where $P_e$ is a four element vector with $p_l$ equal to $v_{oe}$, the absolute value of the emitter offset voltage, in units of $kT/q$; $p_2$ equal to $m_e$, the emitter grading coefficient; $p_3$ equal to $a_{e1}$, the emitter zero bias capacitance coefficient; and $p_4$ equal to $a_{e2}$, the emitter peak capacitance coefficient.

4. The apparatus of claim 1 further including means for determining the capacitively stored charge of the collector of said transistor from the relationship:

$$\left[f(v,P)=p_3\left\{\frac{1}{(1+p_4)^{p_2}}+\frac{(v/p_1-1)}{[(v/p_1-1)^2+p_4]^{p_2}}\right\}\right]$$

$$f(v,P_c)=p_3\left\{\frac{1}{(1+p_4)^{p_2}}+\frac{(v/p_1-1)}{[(v/p_1-1)^2+p_4]^{p_2}}\right\}$$

where $v$ is the built-in voltage of the collector-base junction in units of $kT/q$; and where $P_c$ is a four element vector with $p_l$ equal to $v_{oc}$, the absolute value of the collector offset voltage, in units of $kT/q$; $q$ is the magnitude of the electronic charge; $k$ is Boltzmann's constant; $T$ is the absolute temperature; $p_2$ equal to $m_c$, the collector grading coefficient; $p_3$ equal to $a_{c1}$, the collector zero bias capacitance coefficient; and $p_4$ equal to $a_{c2}$, the collector peak capacitance coefficient.

5. The apparatus of claim 1 wherein said means for determining collector currents comprises:

means for computing the value of $$I_c=-I_sQ_{bo}\frac{\exp\,(qV_{eb}|kT)-\exp\,(qV_{cb}|kT)}{Q_b}+I_{bc}$$

where $I_c$ is the collector current, $I_s$ is the intercept current, $Q_{bo}$ is the zero-bias value of the base charge, $q$ is the magnitude of the electronic charge, $V_{eb}$ is the emitter-to-base voltage, $V_{cb}$ is the collector-to-base voltage, $k$ is Boltzmann's constant, $T$ is the absolute temperature, $I_{bc}$ is the collector-voltage-controlled component of the base current, and where $Q_b$, the base charge, is an explicit function of the external bias applied to said transistor.

6. Apparatus for computing the terminal characteristics of a bipolar transistor comprising:

means for computing the value of $i_c=I_c\,|\,I_k;$ means for computing the value of $v_e=(qV_{eb}\,|\,kT)-v_k;$ means for computing the value of $v_c=(qV_{cb}\,|\,kT)-v_k;$ means for computing the value of $q_b=Q_b\,|\,(I_k\tau_f);$ means for computing the value of $$f(v,P)=p_3\left\{\frac{1}{(1+p_4)^{p_2}}+\frac{(v/p_1-1)}{[(v/p_1-1)^2+p_4]^{p_2}}\right\};$$

means for computing the value of $i_{be}=i_1\,(e^{v_e}-e_k)+i_2\,(e^{v_e}/ne-e_{ke})\,;$ means for computing the value of $i_{bc}=i_3\,(e^{v_c/n_c}-e_{kc})\,;$ means for computing the value of $i_b=-i_{be}-i_{bc};$ means for computing the value of $i_4=i_c+(v_{oc}-v_c-v_k)/v_{rp};$ means for computing the value of $$B=\left\{1+r_w\frac{[\sqrt{i_4^2+r_p}-i_4]^{n_2}}{4(i_c^2+i_p)}\right\}^2;$$

means for computing the value of $q_1=1+f(v_e+v_k,P_e)+f(v_c+v_k,P_c);$ means for computing the value of $q_2=B(e^{v_e}-e_k)+r_t(e^{v_c}-e_k)\,;$ means for computing the value of $q_b=q_1/2+\sqrt{(q_1/2)^2+q_2}\,;$ means for computing the value of $$i_c=-\frac{e^{v_e}-e^{v_c}}{q_b}+i_{bc};$$

means for computing the value of $e_k = \exp(-v_k)$;

means for computing the value of $e_{ke} = \exp(-v_k/n_e)$;

means for computing the value of $e_{kc} = \exp(-v_k/n_c)$;

where $I_c$ is the collector current, $q$ is the magnitude of the electronic charge, $V_{eb}$ is the emitter-to-base voltage, $V_{cb}$ is the collector-to-base voltage, $k$ is Boltzmann's constant, $T$ is the absolute temperature, $Q_b$ is the base charge, $I_k$ is the knee current, $v_k$ is the absolute value of the knee voltage, in units of $kT/q$; $\tau_f$ is the forward delay time; $r_t$ is the ratio of reverse to forward delay time; $i_l$ is the ideal base current coefficient; $i_2$ is the nonideal base current coefficient; $n_e$ is the forward base current emission coefficient; $i_3$ is the reverse base current coefficient; $n_c$ is the reverse base current emission coefficient; $P_e$ is a four element vector comprising $v_{oe}$, the absolute value of emitter offset voltage, in units of $kTlq$; $m_e$, the emitter grading coefficient; $a_{e1}$, the emitter zero bias capacitance coefficient; $a_{e2}$, the emitter peak capacitance coefficient; $P_c$ is a four element vector comprising $v_{oc}$, the absolute value of collector offset voltage, in units of $kT/q$; $m_c$, the collector grading coefficient, $a_{c1}$, the collector zero bias capacitance coefficient; $a_{c2}$, the collector peak capacitance coefficient; and where $v_{rp}$ is the absolute value of the base push-out reference voltage, in units of $kT/q$; $r_w$ is the effective base width ratio; $r_p$ is the base push-out transition coefficient; and $n_p$is the base push-out exponent.

7. A machine-implemented process for predicting the performance characteristics of a transistor including the steps of machine determining collector currents for said transistor inversely dependent upon the values of the base charge on said transistor, and machine determining said base charge values from an explicit representation of the external bias applied to said transistor.

8. The process of claim 7 further including the step of machine determining the increase in forward transit time of said transistor due to base push-out from the relationship:

$$B=\left\{1+r_w\frac{[\sqrt{i_4^2+r_p}-i_4]^{n_p}}{4\,(i_c^2+r_p)}\right\}^2$$

where $B$ is said increase in forward transit time; $r_w$ is the effective base width ratio;

$r_p$ is the base push-out transition coefficient; $n_p$ is the base push-out exponent; $i_c$ is the normalized value of the collector current; and $i_4$ is defined by:

$$i_4=i_c+(v_{oc}-v_c-v_k)\mid v_{rp}$$

where $v_{oc}$ is the absolute value of collector offset voltage, in units of $kT$ $q$; $v_c$ is the normalized value of the collector voltage; $v_k$ is the absolute value of the knee voltage; and $v_{rp}$ is the absolute value of the base push-out reference voltage.

9. The process of claim 7 further including the step of machine determining the capacitively stored charge of the emitter of said transistor from the relationship:

$$f(v,P)=p_3\left\{\frac{1}{(1+p_4)^{p^2}}+\frac{(v/p_1-1)}{[(v/p_1-1)^2+p_4]^{p^2}}\right\}$$

where $v$ is the built-in voltage of the emitter-base junction in units of $kT \mid q$; and where $P$ is a four element vector with $p_1$ equal to $v$, the absolute value of the emitter offset voltage, in units of $kT \mid q$; $p_2$ equal to $m_e$, the emitter grading coefficient; $p_3$ equal to $a_{e1}$, the emitter zero bias capacitance coefficient; and $p_4$ equal to $a_{e2}$, the emitter peak capacitance coefficient.

10. The process of claim 7 further including the step of machine determining the capacitively stored charge of the collector of said transistor from the relationship:

$$f(v,P)=p_3\left\{\frac{1}{(1+p_4)^{p^2}}+\frac{(v/p_1-1)}{[(v/p_1-1)^2+p_4]^{p^2}}\right\}$$

where $v$ is c1built-in voltage of the collector-base junction in units of $kT \mid q$; and where $P_c$ is a four element vector with $p_1$ equal to $v_{oc}$, the absolute value of the collector offset voltage, in units of $kT \mid q$; $p_2$ equal to $m_c$, the emitter grading coefficient; $p_3$ equal to $a_{c1}$, the collector zero bias capacitance coefficient; and $p_4$ equal to $a_{c2}$, the collector peak capacitance coefficient.

11. In a machine-implemented process for determining the terminal characteristics of a bipolar transistor, the improvement comprising the step of machine computing the collector current according to the relationship $$I_c=-I_sQ_{bo}\frac{\exp(qV_{eb}|kT)-\exp(qV_{cb}|kT)}{Q_b}+I_{bc},$$

where $I_c$ is the collector current, $I_s$ is the intercept current, $Q_{bo}$ is the zero-bias value of the base charge, $q$ is the magnitude of the electronic charge, $V_{eb}$ is the emitter-to-base voltage, $V_{cb}$ is the collector-to-base voltage, $k$ is Boltzmann's constant, $T$ is the absolute temperature, $I_{bc}$ is the collector-voltage-controlled component of the base, and where $Q_b$, the base charge, is an explicit function of the external bias applied to said transistor.

12. In a machine-implemented process for determining the terminal characteristics of a bipolar transistor, the improvement comprising the steps of:

machine computing the value of $i_c = I_c/I_k$;

machine computing the value of $v_e = (qV_{eb}/kT) - v_k$;

machine computing the value of $v_c = (qV_{cb}/kT) - v_k$;

machine computing the value of $q_b = Q_b/(I_k\tau_f)$;

machine computing the value of $e_k = \exp(-v_k)$;

machine computing the value of $e_{ke} = \exp(+v_k/n_e)$;

machine computing the value of $e_{kc} = \exp(-v_k/n_c)$;

machine computing the value of $i_{be} = i_1(e^{v_e} - e_k) + i_2(e^{v_e/n_e} - e_{ke})$;

machine computing the value of $i_{bc} = i_3(e^{v_c/n_c} - e_{kc})$;

machine computing the value of $i_b = - i_{be} - i_{bc}$;

machine computing the value of $$f(v,P_e) = p_3\left\{\frac{1}{(1+p_4)^{p_2}} + \frac{(v/p_1 - 1)}{[(v/p_1 - 1)^2 + p_4]^{p_2}}\right\};$$

machine computing the value of $$f(v,P_e) = p_3\left\{\frac{1}{(1+p_4)^{p_2}} + \frac{(v/p_1 - 1)}{[(v/p_1 - 1)^2 + p_4]^{p_2}}\right\};$$

machine computing the value of $i_4 = i_c + (v_{oc} - v_c - v_k)/v_{rp}$ machine computing the value of $q_1 = 1 + f(v_e + v_k,P_e) + f(v_e + v_k,P_c)$;

machine computing the value of $$B = \left\{1 + r_w \frac{[\sqrt{i_4^2 + r_p} - i_4]^{n_p}}{4\,(i_c^2 + r_p)}\right\}^2$$

machine computing the value of $q_2 = B(e^{v_e} - e_k) + r_t(e^{v_c} - e_k)$;

machine computing the value of $q_b = q_1/2 + \sqrt{(q_1/2)^2 + q_2}$;

and machine computing the value of $$i_c = -\frac{e^{v_e} - e^{v_c}}{q_b} + i_{bc}\,.$$

where $I_c$ is the collector current, $q$ is the magnitude of the electronic charge, $V_{eb}$ is the emitter-to-base voltage, $V_{cb}$ is the collector-to-base voltage, $k$ is Boltzmann's constant, T is the absolute temperature, $Q_b$ is the base charge; $I_k$ is the knee current, $v_k$ is the absolute value of the knee voltage, in units of $kT|q$; $\tau_f$ is the forward delay time; $r_t$ is the ratio of reverse to forward delay time; $i_1$ is the ideal base current coefficient; $i_2$ is the nonideal base current coefficient; $n_e$ is the forward base current emission coefficient; $i_3$ is the reverse base current coefficient; $n_c$ is the reverse base current emission coefficient; $P_e$ is a four element vector comprising $v_{oe}$, the absolute value of emitter offset voltage, in units of $kT|q$; $m_e$, the emitter grading coefficient; $a_{e1}$, the emitter zero bias capacitance coefficient; $a_{e2}$, the emitter peak capacitance coefficient; $P_c$ is a four element vector comprising $v_{oc}$, the absolute value of collector offset voltage, in units of $kT|q$; $m_c$, the collector grading coefficient; $a_{c1}$, the collector zero bias capacitance coefficient; $a_{c2}$, the collector peak capacitance coefficient; and where $v_{rp}$ is the absolute value of the base push-out reference voltage, in units of $kT|q$; $r_w$ is the effective base width ratio; $r_p$ is the base push-out transition coefficient; and $n_p$ is the base push-out exponent.

13. The process of claim 12 further including the steps of machine computing the partial derivatives of $i_b$ with respect to $v_e$, $v_c$, $i_c$, and $q_b$;

machine computing the partial derivatives of $i_c$ with respect to $v_e$, $v_c$, $i_c$, and $q_b$; and machine computing the partial derivatives with respect to $v_e$, $v_c$, $i_c$, and $q_b$.

* * * * *

UNITED STATES PATENT OFFICE
CERTIFICATE OF CORRECTION

Patent No. 3,683,417 Dated August 8, 1972

Inventor(s) Herman K. Gummel

It is certified that error appears in the above-identified patent and that said Letters Patent are hereby corrected as shown below:

Column 1, line 64, change "test" to --text--.
Column 2, line 47, after "$I_s$" and before "intercept" insert --is the--.
Column 6, line 22, after "$\mu_o$" and before "$\frac{qD_o}{kT}$" insert --$\equiv$--.
Column 7, line 2, change "$X_E$" to --$x_E$--.
line 3, change "$e^{(x)}$" to --$e^{\psi(x)}$--.
line 46, after "has" insert --units of--.
Column 8, line 19, change "$\phi_{nb}$" to --$\varphi_{nb}$--.
line 21, change "$\phi_{nb}$" to --$\varphi_{nb}$--.
line 33, change "$(\phi_{nb})$" to --$(\varphi_{nb})$--.
in approximation (f), after (t), second occurrence, and before "$\varphi$" insert a minus sign.
line 42, change "$\phi_{nb}$" to --$\varphi_{nb}$--.
line 45, change "a" first occurrence, to --$\bar{a}$--.
Column 10, line 18, change "bias" to --base--.
Column 11, in equation (31), change "$1 + q_e + q_c$" to --$\underbrace{1 + q_e + q_c}$--.
Column 12, line 6, after "$r_t$" and before "$\frac{\tau_f}{\tau_r}$" insert --$\equiv$--.
Column 13, equation (52), after "$p_3$" enclose the rest of the equation in braces.
Column 14, line 13, change "$i_1, i_2, i_3, n_c$" to --$i_1, i_2, n_e, i_3, n_c$--.

FORM PO-1050 (10-69)
USCOMM-DC 60376-P69
☆ U.S. GOVERNMENT PRINTING OFFICE : 1969 O—366-334.

Patent No. 3,683,417 Dated August 8, 1972

Inventor Herman K. Gummel

Column 15, line 42, after "required" change the period to a colon.
line 50, change "capacitance" to --capacitive--.
Column 16, line 44, change "$(-V_k/n_e)$" to --$(-v_k/n_e)$--.
Column 17, line 9, after "10" and before "diffused-base" insert --for--.
Column 21, line 3, change "example" to --examples--.
Column 24, line 38, delete "What is claimed is:".
Column 31, before claim 1 insert --What is claimed is:--.
Column 33, line 60, after "kT" and before "q; $v_c$" insert --|--.
Column 34, line 21, after "is" and before "built-in" delete "cl" and insert --the--.
Column 35, line 15, change "$f(v,P_e)$" to --$f(v,P_c)$--.
line 23, change "$v_e$", second occurrence, to --$v_c$--.

Signed and sealed this 20th day of February 1973.

(SEAL)
Attest:

EDWARD M.FLETCHER,JR.
Attesting Officer

ROBERT GOTTSCHALK
Commissioner of Patents